US012154384B2

(12) United States Patent
Oami

(10) Patent No.: US 12,154,384 B2
(45) Date of Patent: Nov. 26, 2024

(54) INFORMATION PROCESSING SYSTEM, INFORMATION PROCESSING APPARATUS, INFORMATION PROCESSING METHOD AND RECORDING MEDIUM

(71) Applicant: NEC Corporation, Tokyo (JP)

(72) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/777,122

(22) PCT Filed: Sep. 27, 2021

(86) PCT No.: PCT/JP2021/035344
§ 371 (c)(1),
(2) Date: May 16, 2022

(87) PCT Pub. No.: WO2023/047573
PCT Pub. Date: Mar. 30, 2023

(65) Prior Publication Data
US 2024/0161547 A1 May 16, 2024

(51) Int. Cl.
G06V 40/40 (2022.01)
G06T 7/70 (2017.01)
G06V 40/18 (2022.01)

(52) U.S. Cl.
CPC ............ *G06V 40/40* (2022.01); *G06T 7/70* (2017.01); *G06V 40/197* (2022.01); *G06T 2207/30201* (2013.01)

(58) Field of Classification Search
CPC ........ G06V 40/40; G06V 40/197; G06T 7/70; G06T 2207/30201
See application file for complete search history.

(56) References Cited

U.S. PATENT DOCUMENTS

2009/0016574 A1  1/2009  Tsukahara

FOREIGN PATENT DOCUMENTS

JP  2007-041831 A   2/2007
JP  4706377 B2      6/2011
JP  2019-191898 A  10/2019
(Continued)

OTHER PUBLICATIONS

Hughes et al., "Detection of Contact-Lens-Based Iris Biometric Spoofs Using Stereo Imaging", 2013, 46th Hawaii International Conference on System Sciences, pp. 1763-1772 (10 pages) (Year: 2013).*

(Continued)

*Primary Examiner* — David F Dunphy
(74) *Attorney, Agent, or Firm* — Michael Dryja

(57) ABSTRACT

An information processing system (10) comprises: an image acquiring means (110) for acquiring an oblique image in which an eye of a target is captured from an angle different from an angle corresponding to a front of the target; a center detecting means (120) for detecting a center position (23) of a pupil (21) and a center position (24) of an iris (22) from the oblique image; and a determining means (130) for determining whether or not the target is an impersonator on the basis of difference between the center position of the pupil and the center position of the iris. According to this information processing system, it is possible to appropriately detect spoofing using patterned contact lenses.

16 Claims, 20 Drawing Sheets

(56) References Cited

FOREIGN PATENT DOCUMENTS

RU          2630742     *  9/2017   ............. G06V 10/60
WO    2006/088042 A1     8/2006

OTHER PUBLICATIONS

International Search Report for PCT Application No. PCT/JP2021/035344, mailed on Nov. 22, 2021.
Partial Supplementary European Search Report for EP Application No. 21958446.3, dated on Sep. 24, 2024.
Priyanka Das et al., "Iris Liveness Detection Competition (LivDet-Iris)—The 2020 Edition", Sep. 2020, pp. 1-9, XP093203675, Retrieved from the Internet URL: <https://arxiv.org/pdf/2009.00749>.
Adam Czajka et al., "Presentation Attack Detection for Iris Recognition: An Assessment of the State-of-the-Art", ACM Computing Surveys, vol. 51, No. 4, Jul. 31, 2019, pp. 1-35, XP093203666, New York, NY, ISSN: 0360-0300, Retrieved from the Internet URL: <https://dl.acm.org/doi/pdf/10.1145/3232849>.
Sheng-Hsun Hsieh et al., "A Novel Anti-Spoofing solution for Iris Recognition Toward Cosmetic Contact Lens Attack Using Spectral ICA Analysis", Sensors, vol. 18, No. 3, Mar. 6, 2018, p. 795, XP093203670, Issn: 1424-8220, <DOI:10.3390/s18030795>.

\* cited by examiner

INFORMATION PROCESSING SYSTEM, INFORMATION PROCESSING APPARATUS, INFORMATION PROCESSING METHOD AND RECORDING MEDIUM This application is a National Stage Entry of PCT/JP2021/035344 filed on Sep. 27, 2021, the contents of all of which are incorporated herein by reference, in their entirety.

TECHNICAL FIELD

This disclosure relates to technical fields of an information processing system, an information processing apparatus, an information processing method and a recording medium.

BACKGROUND

As this type of system, a system which detects "spoofing" in iris authentication is known. For example, a patent literature 1 discloses a technique detecting spoofing by using a fact that a shape of an iris does not become an oval in capturing an eye of a target from an inclination angle when the target wears a patterned contact lens. A patent literature 2 discloses a technique detecting spoofing by using a reflection characteristic of a cornea area. A patent literature 3 discloses a technique detecting spoofing by irradiating illumination while changing an irradiation angle when images are captured.

CITATION LIST

Patent Literature

Patent Literature 1: Japanese Patent No. 4706377
Patent Literature 2: Japanese Patent Application Laid Open No. 2019-191898
Patent Literature 3: International Publication No. 2006/088042

SUMMARY

Technical Problem

This disclosure aims to improve techniques disclosed in the prior art documents.

Solution to Problem

One aspect of an information processing system of this disclosure comprises: an image acquiring means for acquiring an oblique image in which an eye of a target is captured from an angle which is different from an angle corresponding to a front of the target; a center detecting means for detecting a center position of a pupil and a center position of an iris from the oblique image; and a determining means for determining whether or not the target is an impersonator on the basis of difference between the center position of the pupil and the center position of the iris.

Other aspect of the information processing system of this disclosure comprises: an image acquiring means for acquiring an eye image, in which an eye of a target is captured; a detecting means for detecting an iris of the target and a colored contact lens, which is worn by the target, from the eye image; and a determining means for determining whether or not the target is an impersonator on the basis of a gap between the pupil and a pattern of the colored contact lens.

One aspect of an information processing apparatus of this disclosure comprises: an image acquiring means for acquiring an oblique image in which an eye of a target is captured from an angle, which is different from an angle corresponding to a front of the target; a center detecting means for detecting a center position of a pupil and a center position of an iris from the oblique image; and a determining means for determining whether or not the target is an impersonator on the basis of difference between the center position of the pupil and the center position of the iris.

Other aspect of the information processing apparatus of this disclosure comprises: an image acquiring means for acquiring an eye image, in which an eye of a target is captured; a detecting means for detecting an iris of the target and a colored contact lens, which is worn by the target, from the eye image; and a determining means for determining whether or not the target is an impersonator on the basis of a gap between the pupil and a pattern of the colored contact lens.

One aspect of an information processing method of this disclosure is executed by at least one computer, the information processing method comprises: acquiring an oblique image, in which an eye of a target is captured from an angle which is different from an angle corresponding to a front of the target; detecting a center position of a pupil and a center position of an iris from the oblique image; and determining whether or not the target is an impersonator on the basis of difference between the center position of the pupil and the center position of the iris.

Other aspect of the information processing method of this disclosure is executed by at least one computer, the information processing method comprises: acquiring an eye image, in which an eye of a target is captured; detecting an iris of the target and a colored contact lens, which is worn by the target, from the eye image; and determining whether or not the target is an impersonator on the basis of a gap between the pupil and a pattern of the colored contact lens.

One aspect of a recording medium of this disclosure records a computer program making at least one computer execute an information processing method comprising: acquiring an oblique image, in which an eye of a target is captured from an angle which is different from an angle corresponding to a front of the target; detecting a center position of a pupil and a center position of an iris from the oblique image; and determining whether or not the target is an impersonator on the basis of difference between the center position of the pupil and the center position of the iris.

Other aspect of the recording medium of this disclosure records a computer program making at least one computer execute an information processing method comprising: acquiring an eye image, in which an eye of a target is captured; detecting an iris of the target and a colored contact lens, which is worn by the target, from the eye image; and determining whether or not the target is an impersonator on the basis of a gap between the pupil and a pattern of the colored contact lens.

DESCRIPTION OF EMBODIMENTS

In the following, embodiments of information processing systems, information processing apparatuses, information processing methods and recording media will be described with referring to drawings.

First Embodiment

An information processing system of a first embodiment will be described with referring to FIGS. 1 to 6B.

Hardware Configuration

Figure 1:
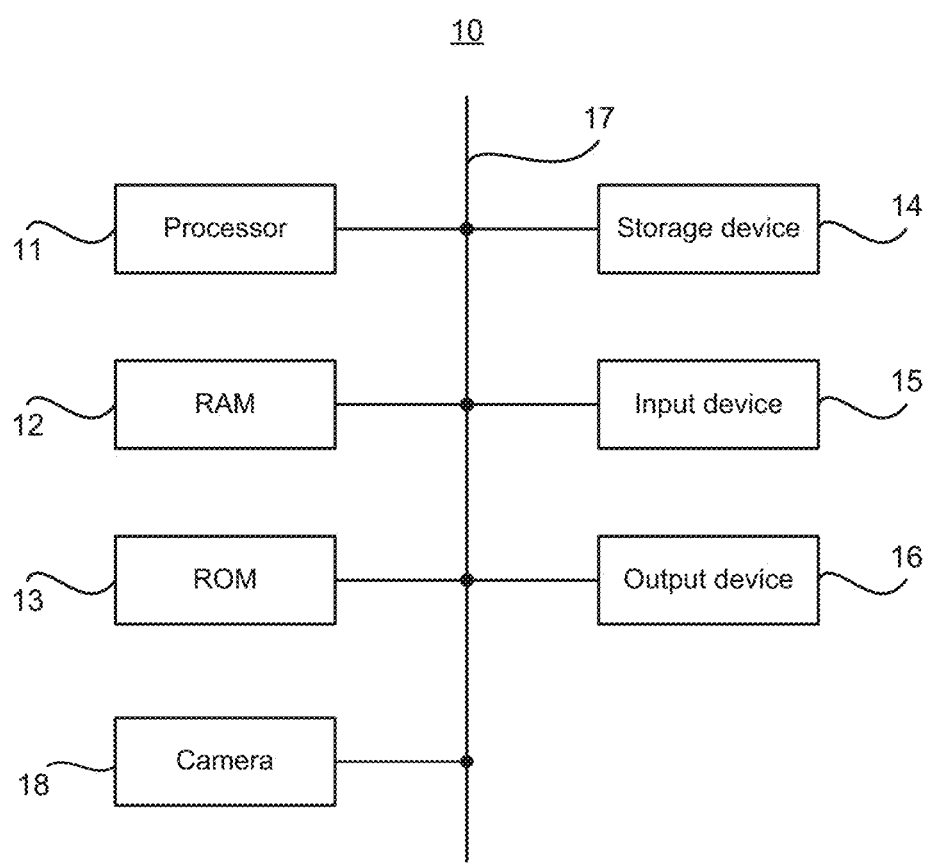
FIG. 1 is a block diagram showing a hardware configuration of an information processing system of a first embodiment.

First, a hardware configuration of the information processing system of the first embodiment will be described with referring to FIG. 1. FIG. 1 is a block diagram showing the hardware configuration of the information processing system of the first embodiment.

As shown in FIG. 1, the information processing system 10 of the first embodiment comprises a processor 11, a RAM (Random Access Memory) 12, a ROM (Read Only Memory) 13 and a storage device 14. The information processing system may further comprise an input device 15 and an output device 16. Moreover, the information processing system 10 may comprise a camera 18. The processor 11, the RAM 12, the ROM 13, the storage device 14, the input device 15, the output device 16 and the camera 18 described above are connected through a data bus 17.

The processor 11 reads computer programs. For example, the processor is configured to read a computer program stored in at least one of the RAM 12, the ROM 13 and the storage device 14. The processor 11 may read a computer program stored in a computer-readable recording medium by using a recording medium reading apparatus not shown. The processor 11 may acquire (i.e., read) a computer program from an apparatus, which is located in external to the information processing system 10 and which is not shown, through a network interface. The processor 11 controls the RAM 12, the storage device 14, the input device 15 and the output device 16 by executing a read computer program. In this embodiment, in particular, functional blocks for determining spoofing are realized in the processor 11 when the processor 11 executes the read computer program.

The processor 11 may be configured as a CPU (Central Processing Unit), a GPU (Graphics Processing Unit), an FPGA (Field-Programmable Gate Array), a DSP (Digital Signal Processor), an ASIC (Application Specific Integrated Circuit), for example. The processor 11 may be configured by one of these, or configured to use several of these in parallel.

The RAM 12 temporarily stores computer programs executed by the processor 11. The RAM 12 temporarily stores data temporarily used by the processor 11 when the processor 11 executes a computer program. The RAM 12 may be a D-RAM (Dynamic RAM), for example.

The ROM 13 stores computer programs executed by the processor 11. The ROM 13 may store fixed data in addition to computer programs. The ROM 13 may be a P-ROM (Programmable ROM), for example.

The storage device 14 stores data, which is stored for a long time by the information processing system 10. The storage device 14 may work as a temporary storage device of the processor 11. The storage device 14 may include at least one of a hard-disk apparatus, a light-magnetic disk apparatus, an SSD (Solid State Drive) and a disk array apparatus, for example.

The input device 15 is an apparatus receiving input instructions from a user of the information processing system 10. The input device 15 may include at least one of a keyboard, a mouse and a touch panel, for example. The input device 15 may be configured as a mobile terminal such as a smartphone, a tablet or the like.

The output device 16 is an apparatus outputting information in associated with the information processing system 10 to external. The output device 16 may be a display apparatus (e.g., a display) which can display information in associated with the information processing system 10, for example. The output device 16 may be a speaker or the like which can output audio corresponding to information in associated with the information processing system 10. The output device may be configured as a mobile terminal such as a smartphone, a tablet or the like.

The camera 18 is a camera set at a place, where images of a target (specifically, images of an area around an eye including an iris of the target) can be captured. There may be a plurality of cameras 18. The camera 18 may be a camera attached to a terminal (e.g., a smartphone), which is owned by a target. The camera 18 may be a USB camera, an IP camera, a Web camera or the like. The camera 18 may be a camera capturing still images, or a camera capturing video. The camera 18 may be configured as a visible-light camera, or configured as a near infrared camera. Targets of the camera 18 may include not only humans but also animals such as dogs, snakes or the like, robots or the like.

FIG. 1 shows an example of the information processing system 10 configured to include multiple devices. All of or a part of functions of the information processing system 10 may be realized by one apparatus (an information processing apparatus). This information processing apparatus may be configured to comprise, for example, only the processor 11, the RAM 12 and the ROM 13 described above. Other components (i.e., the storage device 14, the input device 15, the output device 16 and the camera 18) may be included in an external apparatus, which is connected to the information processing apparatus, for example. The information processing apparatus may be an apparatus, which makes an external apparatus (e.g., an external server, a cloud or the like) perform a part of arithmetic functions.

Functional Configuration

Figure 2:
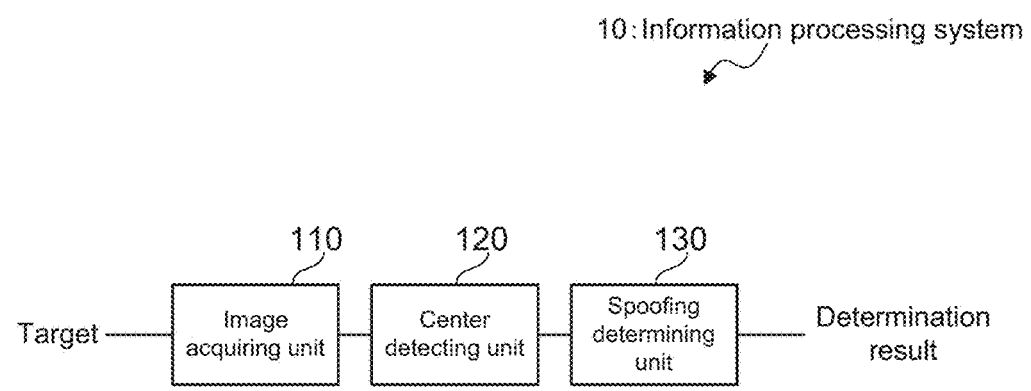
FIG. 2 is a block diagram showing a functional configuration of the information processing system of the first embodiment.

Next, a functional configuration of the information processing system 10 of the first embodiment will be described with referring to FIG. 2. FIG. 2 is a block diagram showing the functional configuration of the information processing system of the first embodiment.

As shown in FIG. 2, the information processing system 10 of the first embodiment is configured to comprise, as components for realizing its functions, an image acquiring unit 110, a center detecting unit 120 and a spoofing determining unit 130. Each of the image acquiring unit 110, the center detecting unit 120 and the spoofing determining unit 130 may be a processing block realized by the above-mentioned processor 11 (see FIG. 1), for example. The image acquiring unit 110 may be a unit acquiring images by using the above-mentioned camera 18.

The image acquiring unit 110 is configured to be able to acquire an iris image of a target (i.e., an image including an iris of the target). The iris image may be acquired as a near infrared ray image. In this case, the image acquiring unit 110 may be configured to be able to irradiate near infrared ray to the target. The image acquiring unit 110 of this embodiment, in particular, is configured to be able to acquire an oblique image, which is captured by capturing an eye of the target from an angle different from an angle corresponding to the front of the target (i.e., inclination). Here, the front of the target is a direction when a face of the target looks straight ahead (see FIGS. 3A, 3B, 3C, 4A, 4B and 4D described later). Incidentally, the oblique image may be an image for which a capturing angle to an iris of a target inclines. For example, the oblique image may be an image captured by changing a gaze direction (in other words, a direction of an eye ball) from the front of a face of a target. The oblique image may be an image acquired by capturing a face of a target from an inclined angle. The oblique image may be an image captured in a condition that both a gaze direction and a capturing angle are inclined. The image acquiring unit 110 may be configured to be able to acquire another image (e.g., an image in which a face of target is captured from the front) in addition to the oblique image. The information processing system 10 is configured to output images acquired by the image acquiring unit 110 to the center detecting unit 120.

Figure 3A:
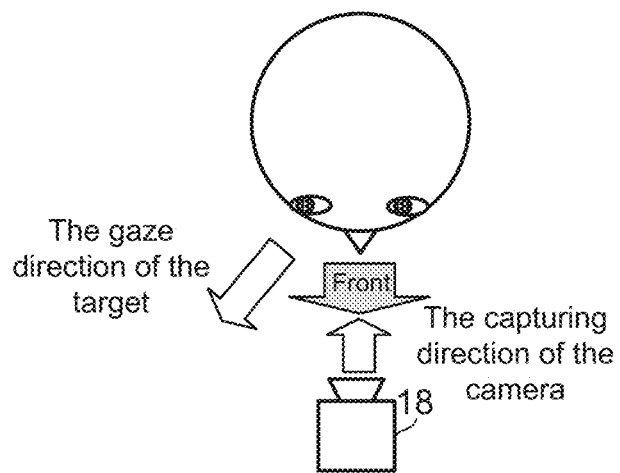
FIG. 3A is a top view showing examples of capturing directions and gaze directions in capturing oblique images.
Figure 3B:
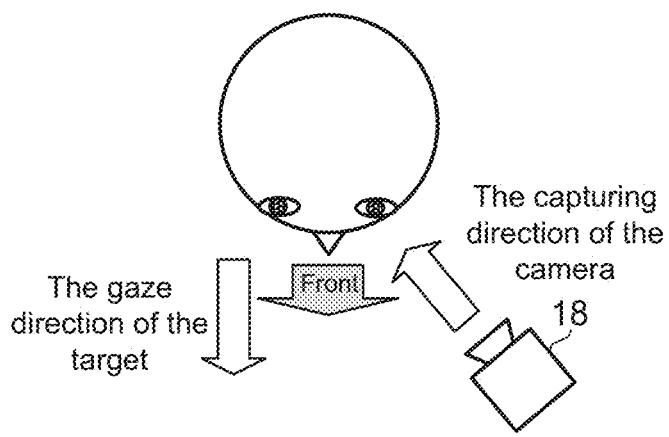
FIG. 3B is a top view showing examples of capturing directions and gaze directions in capturing oblique images.
Figure 3C:
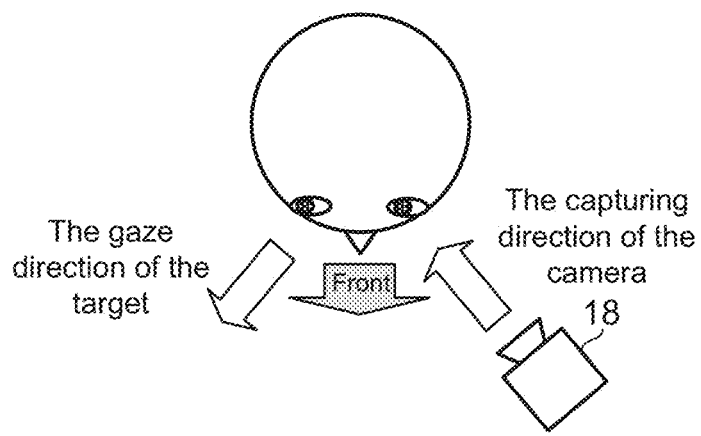
FIG. 3C is a top view showing examples of capturing directions and gaze directions in capturing oblique images.
Figure 4A:
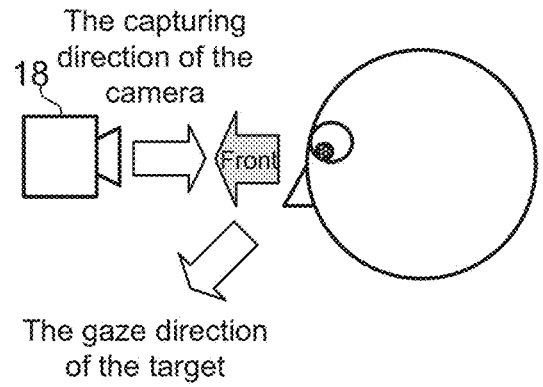
FIG. 4A is a side view showing examples of capturing directions and gaze directions in capturing oblique images.
Figure 4B:
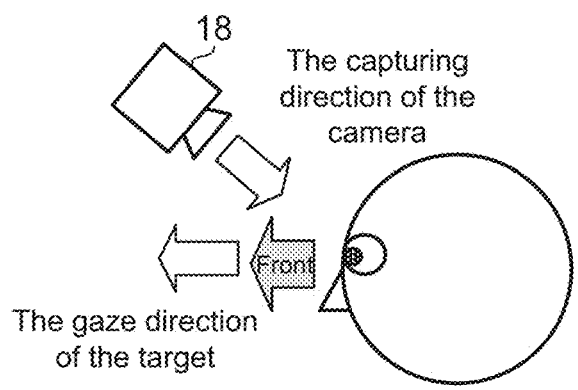
FIG. 4B is a side view showing examples of capturing directions and gaze directions in capturing oblique images.
Figure 4C:
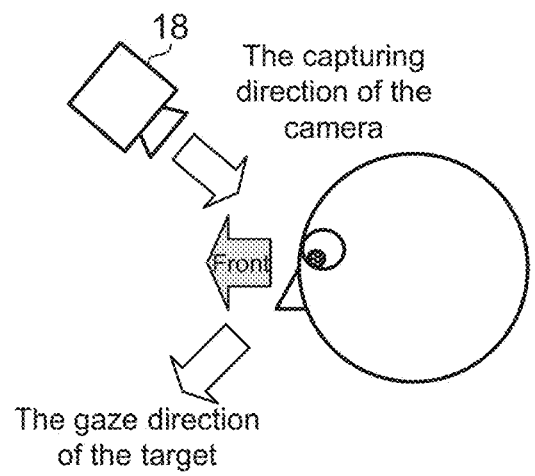
FIG. 4C is a side view showing examples of capturing directions and gaze directions in capturing oblique images.

Here, capturing directions and gaze directions in capturing oblique images will be described by giving examples with referring to FIGS. 3A, 3B, 3C, 4A, 4B and 4C. FIGS. 3A, 3B and 3C are a top view showing examples of capturing directions and gaze directions in capturing oblique images. FIGS. 4A, 4B and 4C are a side view showing examples of capturing directions and gaze directions in capturing oblique images.

As shown in FIG. 3A, an oblique image of an eye of a target can be captured by directing a gaze direction to the left toward the target when the camera 18 is placed in front of the face of the target. As shown in FIG. 3B, an oblique image of the eye of the target can be captured by placing the camera 18 on the right side toward the target even if the gaze direction of the target is frontal. As shown in FIG. 3C. an image of the eye of the target can be captured from more diagonal angle by placing the camera 18 on the right side toward the target and directing the gaze direction of the target to the left side toward the target, which is an opposite side of the camera 18.

As shown in FIG. 4A, an oblique image of the eye of the target can be captured by directing a gaze direction to the upper side when the camera 18 is placed in front of the target. As shown in FIG. 4B, an oblique image of the eye of the target can be captured by placing the camera 18 above the front of the face of the target even if a gaze direction of the target is frontal. As shown in FIG. 4C, an image of the eye of the target can be captured from more diagonal angle by placing the camera 18 above the front of the face of the target and directing a gaze direction of the target to the lower side, which is an opposite side of the camera 18.

Return to FIG. 2, the center detecting unit 120 is configured to be able to detect a center position of a pupil (hereinafter, appropriately called "pupil center") and a center position of an iris (hereinafter, appropriately called "iris center") from an image acquired by the image acquiring unit 110. The pupil center and the iris center may be obtained as coordinate information respectively. The center detecting unit 120 may be configured to be able to acquire information associated with an eye other than the pupil center and the iris center. The center detecting unit 120 may be configured to be able to acquire a radius of a pupil, a radius of an iris or the like, for example. The information processing system 10 is configured to output each information detected by the center detecting unit 120 to the spoofing determining unit 130.

The spoofing determining unit 130 is configured to be able to determine whether or not a target is an impersonator on the basis of difference between the pupil center and the iris center detected by the center detecting unit 120. The spoofing determining unit 130 detects, for example, spoofing using a patterned contact lens (e.g., a contact lens on which an iris pattern of another person is printed). The spoofing determining unit 130 may determine that a target is an impersonator when the difference between the pupil center and the iris center is greater than a predetermined threshold value. On the other hand, the spoofing determining unit 130 may determine that a target is not an impersonator when the different between the pupil center and the iris center is less than the predetermined threshold value. The difference between the pupil center and the iris center will be described in detail later.

Flow of Operation

Figure 5:
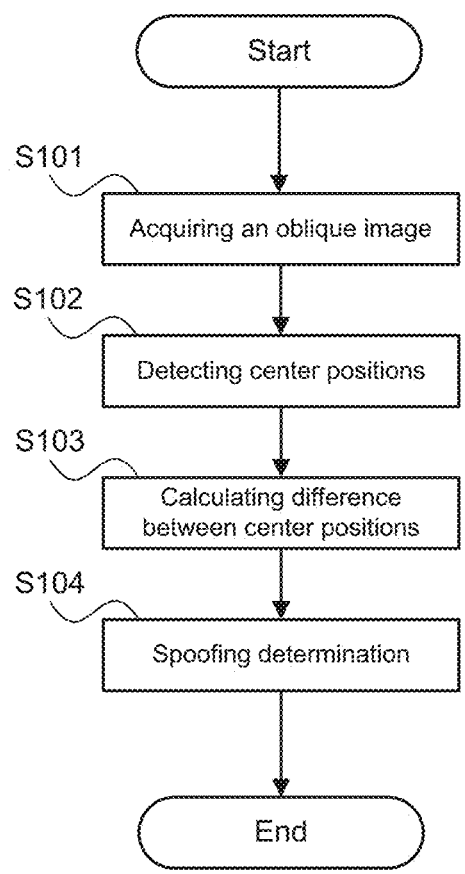
FIG. 5 is a flowchart showing flow of operation of the information processing system of the first embodiment.

Next, flow of operation of the information processing system 10 of the first embodiment will be described with referring to FIG. 5. FIG. 5 is a flowchart showing the flow of the operation of the information processing system 10 of the first embodiment.

As shown in FIG. 5, when the information processing system 10 of the first embodiment operates, first, the image acquiring unit 110 acquires an oblique image of a target (step S101). Then, the center detecting unit 120 detects a pupil center and an iris center from the oblique image acquired by the image acquiring unit 110 (step S102).

Then, the spoofing determining unit 130 calculates different between the pupil center and the iris center detected by center detecting unit 120 (step S103). Then, the spoofing determining unit 130 determines whether or not the target is an impersonator on the basis of the different between the pupil center and the iris center (step S104).

The spoofing determining unit 130 may output a result of a spoofing determination to a user (e.g., a system administrator, an observer or the like). Outputting the result of the spoofing determination may be performed by using the output device 16 (see FIG. 1), for example. For example, the result of the spoofing determination may be outputted as image display by using a display or as audio by a speaker. When it is determined that a target is an impersonator, the spoofing determining unit 130 may issue a warning (alert).

Incidentally, the series of actions described above may be performed repeatedly multiple times. In this case, it is possible to improve accuracy of the spoofing determination by changing capturing directions of oblique images. For example, when an oblique image is captured from diagonally right for a first time, an oblique image may be captured from diagonally left for a second time.

Difference Between Center Positions

Figure 6A:
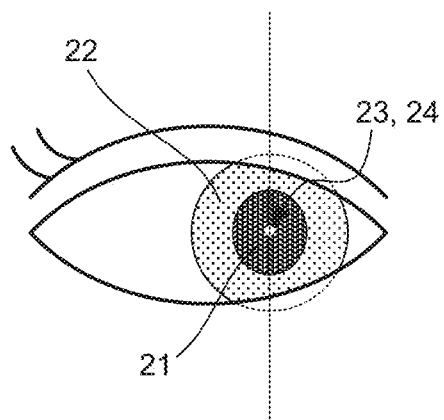
FIG. 6A a plane view showing examples of a difference between a center position of a pupil and a center position of an iris.
Figure 6B:
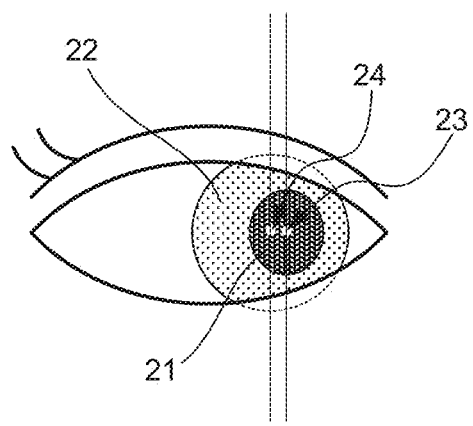
FIG. 6B a plane view showing examples of a difference between a center position of a pupil and a center position of an iris.

Next, difference between a pupil center and an iris center will be specifically described with referring to FIGS. 6A and 6B. FIGS. 6A and 6B are a plane view showing examples of a difference between a center position of a pupil and a center position of an iris.

As shown in FIG. 6A, when a target is not an impersonator (i.e., when an actual pupil 21 and an actual iris 22 are captured), since the iris 22 is planar, a pupil center 23, which is a center position of the pupil 21, and an iris center 24, which is a center position of the iris 22, almost matches in an oblique image. On the other hand, as shown in FIG. 6B, when a target is an impersonator (i.e., when a patterned contact lens is captured instead of an actual iris 23 of a target), since the patterned contact lens has a spherical shape, a pupil center 23 and an iris center 24 (in actuality, a center of a pattern printed on the patterned contact lens) do not match in an oblique image. Specifically, the pupil center 23 shifts in a direction, which is the same as a gaze direction, with respect to the iris center 24. In this embodiment, spoofing is determined from the difference between the pupil center 23 and the iris center 24 by using the above-mentioned characteristic.

Technical Effects

Next, technical effects obtained by the information processing system 10 of the first embodiment will be described.

As described with referring to FIGS. 1 to 6B, in the information processing system 10 of the first embodiment, it is determined whether or not a target is an impersonator on the basis of difference between a pupil center 23 and an iris center 24 in an oblique image. In this manner, it is possible to appropriately determine spoofing using a patterned contact lens. Therefore, it is possible to prevent illegally breaking through an iris authentication or the like.

Incidentally, when a target is an impersonator, a shape of an iris changes in an oblique image. However, it is required to capture an eye of a target from a more oblique angle (i.e., a large angle) in order to detect change of the shape. In this case, there is a big restriction on a position at which a camera is placed, and there is possibility that accuracy of an authentication processing using an iris image deteriorates. In the information processing system 10 of this embodiment, it is possible to accurately detect spoofing by using an oblique image captured at a small angle compared with the above-mentioned configuration in which change of the shape is detected.

Second Embodiment

An information processing system 10 of a second embodiment will be described with referring to FIG. 7. The second embodiment differs from the first embodiment described above in only a part of operation. Remaining portions of the second embodiment may be the same as the first embodiment. Therefore, portions, that differ from the embodiment already described, of the second embodiment will be described in detail, and descriptions of remaining portions, that are overlapped with the embodiment already described, are appropriately omitted.

Flow of Operation

First, flow of operation of the information processing system 10 of the second embodiment will be described with referring to FIG. 7. FIG. 7 is a flowchart showing the flow of the operation of the information processing system of the second embodiment. Incidentally, in FIG. 7, the same sign is put to a processing which is similar to a processing shown in FIG. 5.

Figure 7:
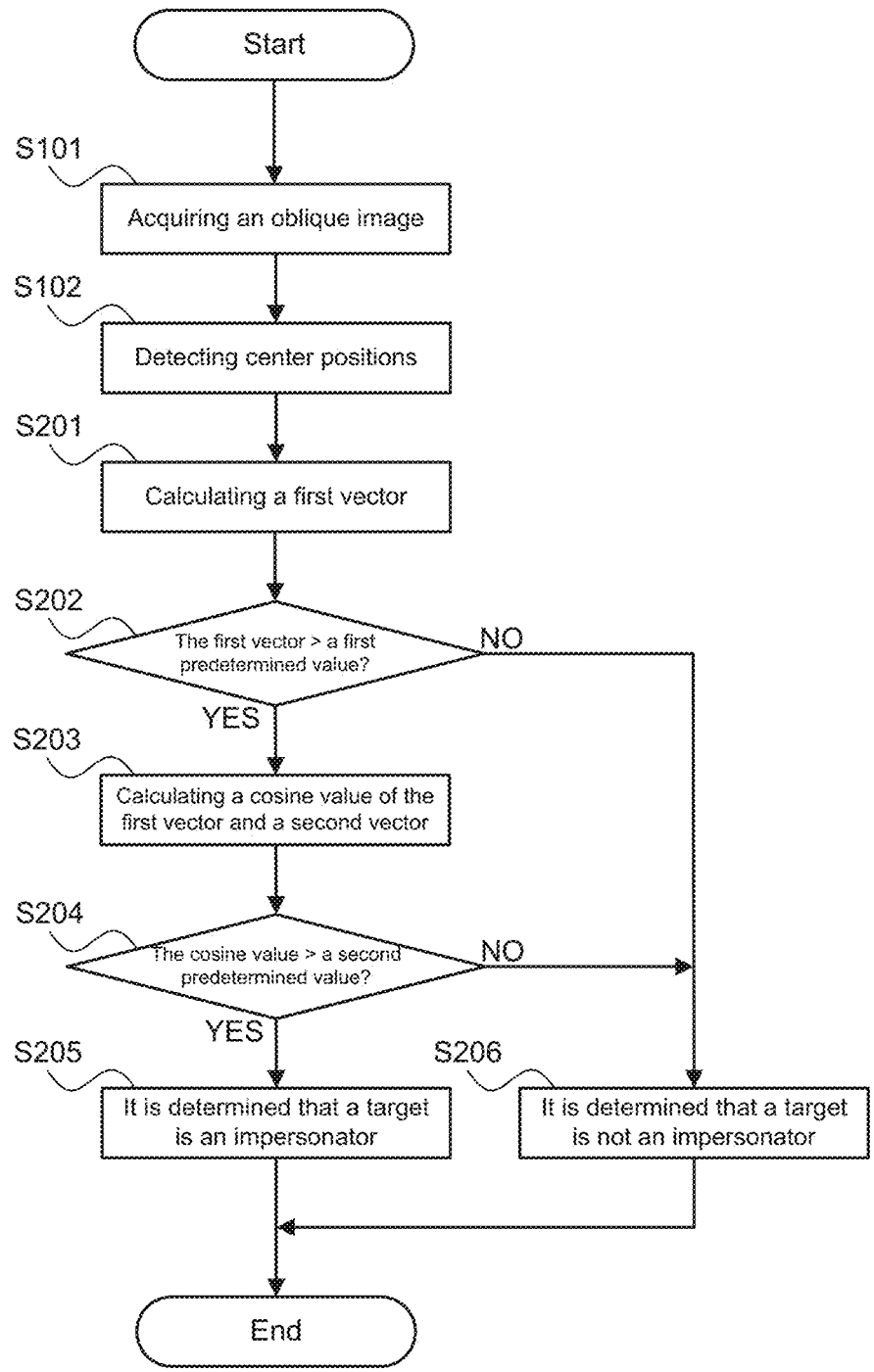
FIG. 7 is a flowchart showing flow of operation of an information processing system of a second embodiment.

As shown in FIG. 7, when the information processing system 10 of the second embodiment operates, first, an image acquiring unit 110 acquires an oblique image of a target (step S101). Then, a center detecting unit 120 detects a pupil center 23 and an iris center 24 from the oblique image acquired by the image acquiring unit 110 (step S102).

Then, a spoofing determining unit 130 calculates a first vector, a starting point of which is the iris center 24, and an end point of which is the pupil center 23 (step S201). Then, the spoofing determining unit 130 determines whether or not the first vector is greater than a first predetermined value (step S202). The "first predetermined value" is a threshold value for determining whether or not difference between the pupil center 23 and the iris center 24 is large enough to be able to determine that a target may be an impersonator. The first predetermined value may be set appropriately in advance.

When the first vector is greater than the first predetermined value (step S202: YES), the spoofing determining unit 130 calculates a cosine value of an angle formed by the first vector and a second vector which indicates a gaze direction of the target (step S203). The second vector is a two-dimensional vector which is obtained by projecting an estimated gaze direction on an image. Existing various methods, for example, can be applied to estimating a gaze direction. Then, the spoofing determining unit 130 determines whether or not the angle formed by the first vector and the second vector is greater than a second predetermined value (step S204). The "second predetermined value" is a threshold value for determining whether or not the calculated cosine value is large enough to be able to determine that a target is an impersonator. The second predetermined value may be set appropriately in advance.

When the cosine vale of the angle formed by the first vector and the second vector is greater than the second predetermined value (step S204: YES), the spoofing determining unit 130 determines that the target is an impersonator (step S205). On the other hand, when the first vector is less than the first predetermined value (step S202: NO), or when the cosine value of the angle formed by the first vector and the second vector is less than the second predetermined value (step S204: NO), the spoofing determining unit 130 determines that the target is not an impersonator (step S206).

Technical Effects

Next, technical effects obtained by the information processing system 10 of the second embodiment will be described.

As described with referring to FIG. 7, in the information processing system 10 of the second embodiment, it is determined whether or not a target is an impersonator by using the first vector indicating the difference between the pupil center 23 and the iris center 24 and the second vector indicating the gaze direction of the target. Therefore, it is possible to appropriately determine spoofing on the basis of the difference between the pupil center 23 and the iris center 24.

Third Embodiment

An information processing system 10 of a third embodiment will be described with referring to FIG. 8. The third embodiment differs from the first and the second embodiments described above in only a part of operation. Remaining portions of the third embodiment may be the same as the first and the second embodiments. Therefore, portions, that differ from embodiments already described, of the third embodiment will be described in detail, and descriptions of remaining portions, that are overlapped with embodiments already described, are appropriately omitted.

Flow of Operation

First, flow of operation of the information processing system 10 of the third embodiment will be described with referring to FIG. 8. FIG. 8 is a flowchart showing the flow of the operation of the information processing system of the third embodiment. Incidentally, in FIG. 8, the same sign is put to a processing, which is similar to a processing shown in FIG. 5.

Figure 8:
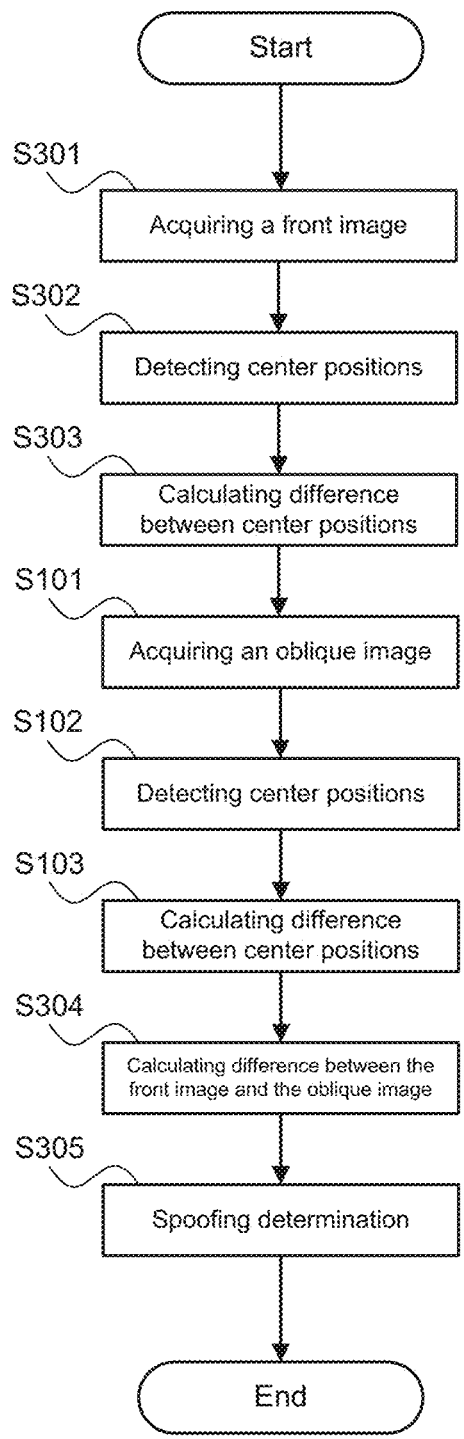
FIG. 8 is a flowchart showing flow of operation of an information processing system of a third embodiment.

As shown in FIG. 8, when the information processing system 10 of the third embodiment operates, first an image acquiring unit 110 acquires a front image by capturing an eye of a target from the front of the target (step S301). Then, a center detecting unit 120 detects a pupil center 23 and an iris center 24 from the front image acquired by the image acquiring unit 110 (step S302). Then, a spoofing determining unit 130 calculates difference between the pupil center and the iris center detected by the center detecting unit 120 (step S303).

Then, the image acquiring unit 110 acquires an oblique image of the target (step S101). Then, the center detecting unit 120 detects a pupil center 23 and an iris center 24 from the oblique image acquired by the image acquiring unit 110 (step S102). Then, the spoofing determining unit 130 calculates difference between the pupil center 23 and the iris center 24 detected by the center determining unit 120 (step S103).

Then, the spoofing determining unit 130 calculates difference between the difference between the pupil center 23 and the iris center 24 in the front image and the difference between a pupil center 23 and an iris center 24 in the oblique image (step S304). Then, the spoofing determining unit 130 determines whether or not the target is an impersonator on the basis of the difference calculated in the step S304 (step S305). The spoofing determining unit 130 may determine that the target is an impersonator when the difference calculated in the step S304 is greater than a predetermined threshold value.

Incidentally, in this embodiment, the oblique image is acquired after acquiring the front image. However, the front image may be captured after acquiring the oblique image. In other words, steps S101-S103 are performed before performing steps S301-S303.

Technical Effects

Next, technical effects obtained by the information processing system 10 of the third embodiment will be described.

As described with referring to FIG. 8, in the information processing system 10 of the third embodiment, spoofing is determined by comparing the difference between the pupil center 23 and the iris center 24 in the front image with the difference between the pupil center 23 and the iris center 24 in the oblique image. Therefore, it is possible to appropriately determine spoofing even if the pupil center 23 and the iris center 24 of the target are originally different from each other.

Fourth Embodiment

An information processing system 10 of a fourth embodiment will be described with referring to FIGS. 9 and 10. The fourth embodiment differs from the first to the third embodiments described above in only a part of configurations and operation. Remaining portions of the fourth embodiment may be the same as the first to the third embodiments. Therefore, portions, that differ from embodiments already described, of the fourth embodiment will be described in detail, and descriptions of remaining portions, that are overlapped with embodiments already described, are appropriately omitted.

Functional Configuration

First, a functional configuration of the information processing system 10 of the fourth embodiment will be described with referring to FIG. 9. FIG. 9 is a block diagram showing the functional configuration of the information processing system of the fourth embodiment. Incidentally, in FIG. 9, the same sign is put to an element, which is similar to a component shown in FIG. 2.

Figure 9:
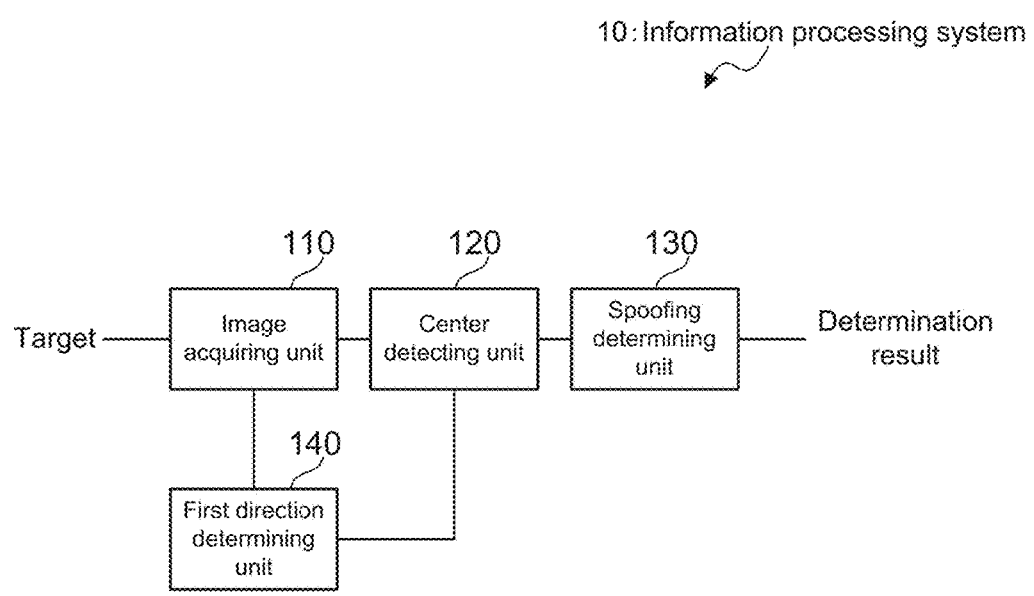
FIG. 9 is a block diagram showing a functional configuration of an information processing system of a fourth embodiment.

As shown in FIG. 9, the information processing system 10 of the fourth embodiment comprises, as components for realizing its functions, an image acquiring unit 110, a center detecting unit 120, a spoofing determining unit 130 and a first direction determining unit 140. In other words, the information processing system 10 of the fourth embodiment further comprises the first direction determining unit 140 in addition to the configuration of the first embodiment (see FIG. 2). The first direction determining unit 140 may be a processing block realized by the above-mentioned processor 11 (see FIG. 1), for example.

The first direction determining unit 140 is configured to be able to determine at least one of a capturing direction and an angle in capturing an oblique image on the basis of difference between a pupil center 23 and an iris center 24 in a front image, in which an eye of a target is captured from the front. The first direction determining unit 140 may determine to capture from diagonally right when the pupil center 23 shifts to the right from the iris center 24, and may determine to capture from diagonally left when the pupil center 23 shifts to the left from the iris center 24. In other words, the first direction determining unit 140 may obtain a vector, a starting point of which is the iris center 24, and an end point of which is the pupil center 23, and then, may determine to capture from diagonally right to the target when a direction of the vector is right to the target (e.g., a gaze or a face of a target turns to the left to the target). When the target does not wear patterned contact lenses, and the pupil center 23 and the iris center 24 are originally different from each other, degree of the difference between the pupil center 23 and the iris center 24 does not change even if the eye of the target is captured from diagonal. However, when the target wears patterned contact lenses, and the pupil center 23 and the iris center 24 are hence different from each other, the degree of the difference between the pupil center 23 and the iris center 24 changes if the eye of the target is captured from diagonal. Therefore, it is possible to determine whether or not the target wears patterned contact lenses. (When the target wears patterned contact lenses, a reason why the pupil center 23 and the iris center 24 is different in capturing the eye of the target from the front is considered to be due to a diagonal gaze of the target. Therefore, it is possible to determine easily by directing the gaze to the opposite side.) The first direction determining unit 140 may make a capturing angle (i.e., a tilt to diagonal) of an oblique image small when the difference between the pupil center 23 and the iris center 24 is relatively large, and may make the capturing angle large when the difference between the pupil center 23 and the iris center 24 is relatively small (or when the difference does not occur).

Flow of Operation

Next, flow of operation of the information processing system 10 of the fourth embodiment will be described with referring to FIG. 10. FIG. 10 is a flowchart showing the flow of the operation of the information processing system of the fourth embodiment. Incidentally, in FIG. 10, the same sign is put to a processing, which is similar to a processing shown in FIG. 8.

Figure 10:
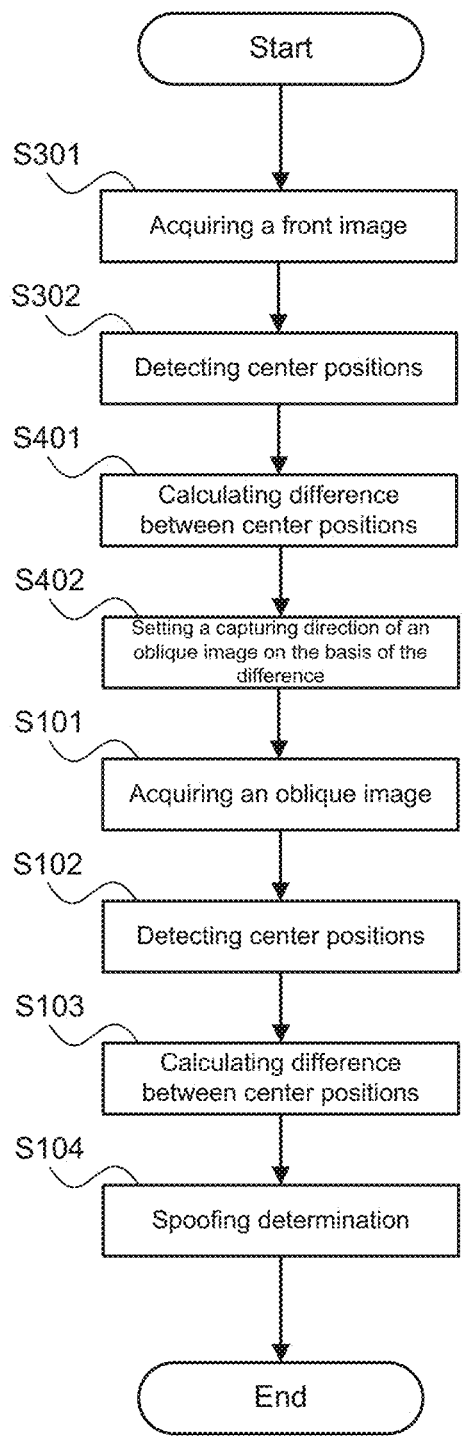
FIG. 10 is a flowchart showing flow of operation of the information processing system of the fourth embodiment.

As shown in FIG. 10, when the information processing system 10 of the fourth embodiment operates, first, the image acquiring unit 110 acquires a front image, in which an eye of a target is captured from the front (step S301). Then, the center detecting unit 120 detects a pupil center 23 and an iris center 24 from the front image acquired by the image acquiring unit 110 (step S302).

Then, the first direction determining unit 140 calculates a difference between the pupil center 23 and the iris center 24 detected by the center detecting unit 120 (step S401). Then, the first direction determining unit 140 determines at least one of a capturing direction and degree of an angle of an oblique image on the basis of the calculated difference between the pupil center 23 and the iris center 24 (step S402).

Then, the image acquiring unit 110 acquires an oblique image of the target (step S101). Then, the center detecting unit 120 detects a pupil center 23 and an iris center 24 from the oblique image acquired by the image acquiring unit 110 (step S102). After, the spoofing determining unit 130 calculates a difference between the pupil center 23 and the iris center 24 detected by the center detecting unit 120 (step S103). Then, the spoofing determining unit 130 determines whether or not the target is an impersonator on the basis of the difference between the pupil center 23 and the iris center 24 (step S104).

Technical Effects

Next, technical effects obtained by the information processing system 10 of the fourth embodiment will be described.

As described with referring to FIGS. 9 and 10, in the information processing system 10 of the fourth embodiment, at least one of a capturing direction and an angle of an oblique image is set on the basis of a difference between a pupil center 23 and an iris center 24 in a front image. Therefore, it is possible to capture an oblique image more appropriately in consideration of an initial difference between a pupil center 23 and an iris center 24 of a target.

Fifth Embodiment

An information processing system 10 of a fifth embodiment will be described with referring to FIGS. 11 to 13. The fifth embodiment differs from the first to the fourth embodiments described above in only a part of configurations and operation. Remaining portions of the fifth embodiment may be the same as the first to the fourth embodiments. Therefore, portions, that differ from embodiments already described, of the fifth embodiment will be described in detail, and descriptions of remaining portions, that are overlapped with embodiments already described, are appropriately omitted.

Functional Configuration

First, a functional configuration of the information processing system 10 of the fifth embodiment will be described with referring to FIG. 11. FIG. 11 is a block diagram showing the functional configuration of the information processing system of the fifth embodiment. FIG. 12 is a front view showing an example of a capturing direction in capturing a target who has strabismus. Incidentally, in FIG. 11, the same sign is put to an element, which is similar to a component shown in FIG. 2.

Figure 11:
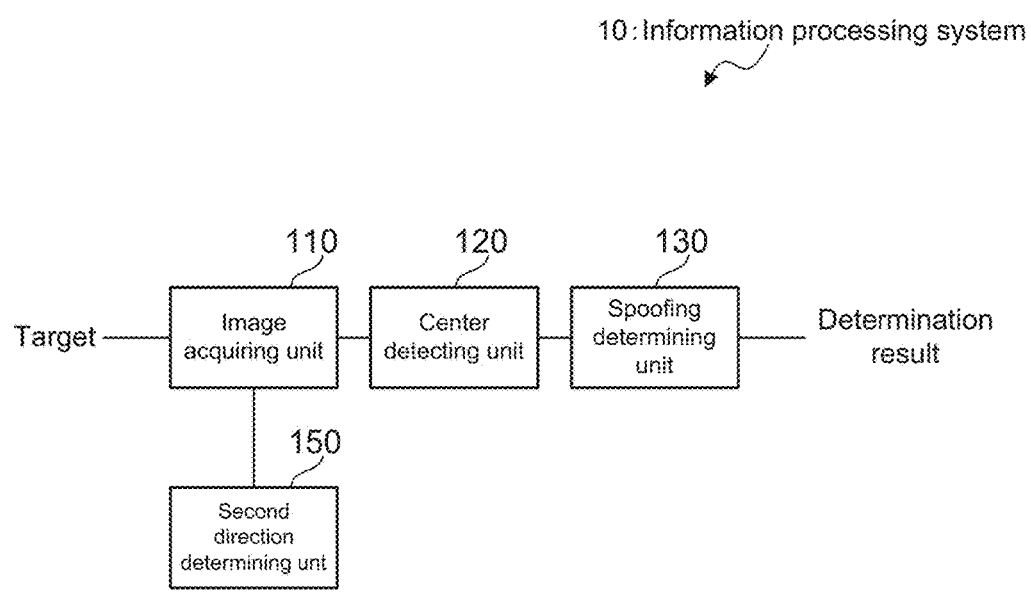
FIG. 11 is a block diagram showing a functional configuration of an information processing system of a fifth embodiment.

As shown in FIG. 11, the information processing system 10 of the fifth embodiment comprises, as components for realizing its functions, an image acquiring unit 110, a center detecting unit 120, a spoofing determining unit 130 and a second direction determining unit 150. In other words, the information processing system 10 of the fifth embodiment further comprises the second direction determining unit 150 in addition to the configuration of the first embodiment (see FIG. 2). The second direction determining unit 150 may be a processing block realized by the above-mentioned processor 11 (see FIG. 1), for example.

The second direction determining unit 150 is configured to be able to determine a capturing direction in capturing an oblique image on the basis of a shift of an iris center 24 (specifically, a difference between a center of an eye and the iris center 24) due to strabismus when a target has strabismus. The second direction determining unit 150 may determine that an oblique image is captured from diagonally right (i.e., a shift direction due to strabismus) when viewed from the front (since a left margin, in which the iris center can move, is large, a gaze directs to the left) when an iris center 24 of a target shifts to the right from a center of an eye in viewing the target from the front (see FIG. 12). Incidentally, the second direction determining unit 150 may have a function for determining whether or not a target has strabismus. In this case, the second direction determining unit 150 may determine whether or not a target has strabismus from a front image, in which a face of the target is captured from the front. A determining method for strabismus is not limited. For example, strabismus can be determined on the basis of a difference between a gaze of one of eyes and a gaze of the other of eyes.

Flow of Operation

Next, flow of operation of the information processing system 10 of the fifth embodiment will be described with referring to FIG. 13. FIG. 13 is a flowchart showing the flow of the operation of the information processing system of the fifth embodiment. Incidentally, in FIG. 13, the same sign is put to a processing, which is similar to a processing shown in FIG. 5.

Figure 13:
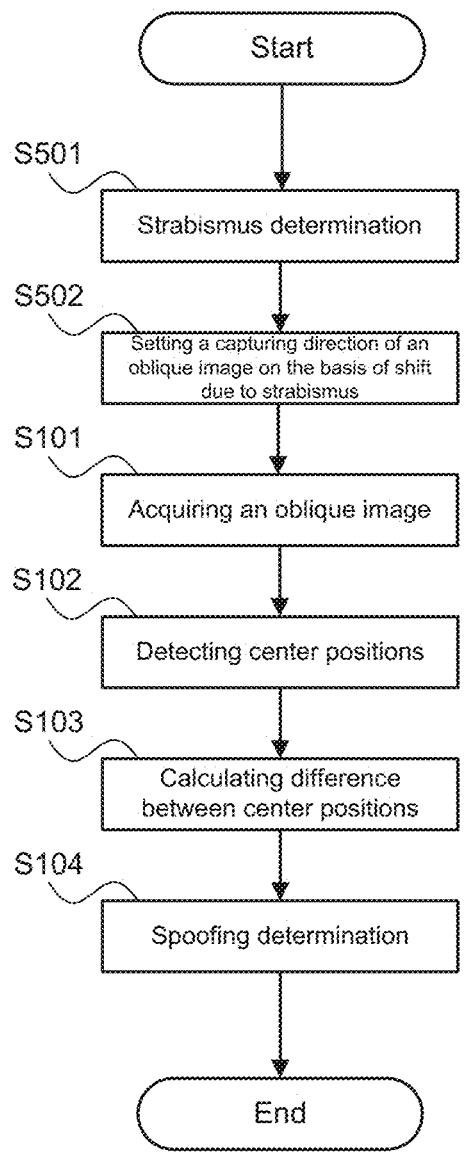
FIG. 13 is a flowchart showing flow of operation of the information processing system of the fifth embodiment.

As shown in FIG. 13, when the information processing system 10 of the fifth embodiment operates, first, the second direction determining unit 150 performs strabismus determination for a target (step S501). The second direction determining unit 150 may perform the strabismus determination by using an image of the target acquired by the image acquiring unit 110. Then, the second direction determining unit 150 determines a capturing direction of an oblique image on the basis of a shift of an iris center 24 due to strabismus (step S502).

Then, the image acquiring unit 110 acquires an oblique image of the target (step S101). Then, the center detecting unit 120 detects a pupil center 23 and an iris center 24 from the oblique image acquired by the image acquiring unit 110 (step S102). After, the spoofing determining unit 130 calculates a difference between the pupil center 23 and the iris center 24 detected by the center detecting unit 120 (step S103). Then, the spoofing determining unit 130 determines whether or not the target is an impersonator on the basis of the difference between the pupil center 23 and the iris center 24 (step S104).

Technical Effects

Next, technical effects obtained by the information processing system 10 of the fifth embodiment will be described.

Figure 12:
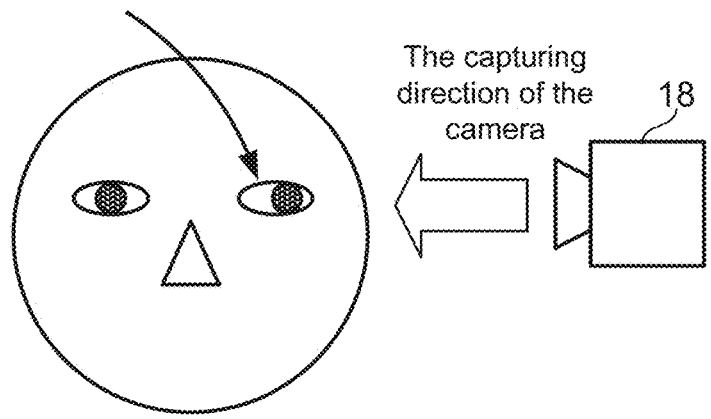
FIG. 12 is a front view showing an example of a capturing direction in capturing a target who has strabismus.

As described with referring to FIGS. 11 to 13, in the information processing system 10 of the fifth embodiment, a capturing direction of an oblique image is determined on the basis of a shift of an iris center 24 due to strabismus. Therefore, it is possible to capture an oblique image more appropriately since a margin for movement becomes large when the oblique image is captured while moving a gaze.

It is possible to capture an oblique image more appropriately by appropriately changing a direction and/or degree of an angle in capturing the oblique image such as the fourth and the fifth embodiments described above. The direction and/or the degree of the angle in capturing the oblique image may set by using information other than the above-mentioned information. For example, when a target wears glasses, the degree of the angle in capturing the oblique image may be larger than the degree of the angle when the target does not wear glasses. Incidentally, when an oblique image is captured, a target may move a gaze or a camera 18 may move so that a gaze direction and a capturing direction are different from each other. An eye of a target may be captured once, or multiple times. It is possible to improve accuracy of determination by capturing an eye of a target multiple times and performing the determination.

Sixth Embodiment

An information processing system of a sixth embodiment will be described with referring to FIGS. 14 to 16C. The sixth embodiment differs from the first to the fifth embodiments described above in only a part of configurations and operation. Remaining portions of the sixth embodiment may be the same as the first to the fifth embodiments. Therefore, portions, that differ from embodiments already described, of the sixth embodiment will be described in detail, and descriptions of remaining portions, that are overlapped with embodiments already described, are appropriately omitted.

Functional Configuration

Figure 14:
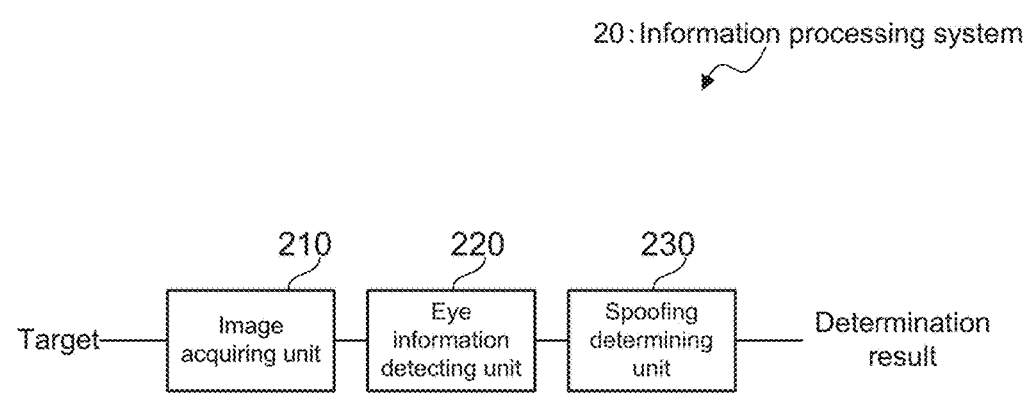
FIG. 14 is a block diagram showing a functional configuration of an information processing system of a sixth embodiment.

First, a functional configuration of the information processing system of the sixth embodiment will be described with referring to FIG. 14. FIG. 14 is a block diagram showing the functional configuration of the information processing system of the sixth embodiment.

As shown in FIG. 14, the information processing system 20 of the sixth embodiment comprises, as components for realizing its functions, an image acquiring unit 210, an eye information detecting unit 220 and a spoofing determining unit 230. Each of the image acquiring unit 220, the eye information detecting unit 220 and the spoofing determining unit 230 may be a processing block realized by the above-mentioned processor 11 (see FIG. 1), for example. The image acquiring unit 210 may acquire an image by using the above-mentioned camera 18.

The image acquiring unit 210 is configured to be able to acquire an eye image of a target (i.e., an image including an eye and a periphery of the eye of the target). The eye image may be acquired as a visible light image, or as a near infrared light image, for example. In this case, the image acquiring unit 210 may be configured to be able to irradiate near infrared light to the target. The image acquiring unit 210 may be configured to be able to capture the eye of the target from the front. The image acquiring unit 210 may be configured to be able to capture the eye of the target from an angle which is not an angle corresponding to the front (i.e., diagonal). The information processing system 20 is configured that the eye image acquired by the image acquiring unit 210 is outputted to the eye information detecting unit 220.

The eye information detecting unit 220 is configured to be able to detect a pupil 21 of the target and colored contact lenses worn by the target from the eye image acquired by the image acquiring unit 210. Incidentally, the "colored contact lens", here, is a contact lens which is colored or on which a pattern is drawn, and is called a colored contact lens or a cosmetic contact lens, for example. Most of colored contact lenses, normally, do not have a pattern at a center portion, and have a pattern, which is printed on a doughnut-like area, which does not include the center portion. Therefore, an inner border of a pattern area of a colored contact lens can be called as inner circle (i.e., a virtual circle indicating a pattern border; a circle is not drawn actually), hereinafter. The eye information detecting unit 220 may be configured to be able to detect place information (coordinate information) and/or size information (e.g., a length of a radius of the inner circle etc.) of the detected pupil 21 and the detected colored contact lens of the target. The eye information detecting unit 220 may be configured to be able to detect information associated with the eye (e.g., information associated with an iris etc.) other than the pupil 21 and the colored contact lens.

The spoofing determining unit 230 is configured to be able to determine whether or not the target is an impersonator on the basis of a gap which occurs between the pupil 21 and a pattern of a colored contact lens detected by the eye information detecting unit 220 (the gap may be called a gap between a pupil and a colored contact lens). The spoofing determining unit 230 may be configured to be able to detect whether or not a gap occurs between the pupil 21 and the colored contact lens. In this case, the spoofing determining unit 230 may determine whether or not the target is an impersonator on the basis of whether or not there is the gap. The spoofing determining unit 230 may be configured to be able to detect size of the gap between the pupil 21 and the colored contact lens. In this case, the spoofing determining unit 230 may determine whether or not the target is an impersonator on the basis of the size of the gap. The gap between the pupil 21 and the colored contact lens will be described in detail later.

Flow of Operation

Figure 15:
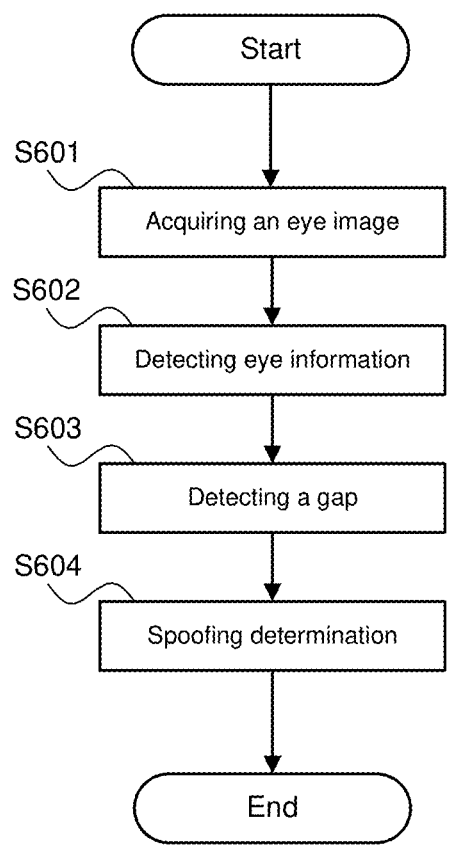
FIG. 15 is a flowchart showing flow of operation of the information processing system of sixth embodiment.

Next, flow of operation of the information processing system 20 of the sixth embodiment will be described with referring to FIG. 15. FIG. 15 is a flowchart showing the flow of the operation of the information processing system of the sixth embodiment.

As shown in FIG. 15, when the information processing system 20 operates, first, the image acquiring unit 210 acquires an eye image of a target (step S601). Then, the eye information detecting unit 220 detects a pupil 21 of the target and a colored contact lens worn by the target (step S602).

Then, the spoofing determining unit 230 detect a gap which occurs between the pupil 21 and the colored contact lens on the basis of information detected by the eye information detecting unit 220 (step S603). Then, the spoofing determining unit 230 determines whether or not the target is an impersonator on the basis of a detection result of the gap in the step S603 (step S604).

The spoofing determining unit 230 may output a result of a spoofing determination to a user (e.g., a system administrator, an observer or the like). Outputting the result of the spoofing determination may be performed by using the output device 16 (see FIG. 1), for example. For example, the result of the spoofing determination may be outputted as image display by using a display or as audio by a speaker. When it is determined that the target is an impersonator, the spoofing determining unit 230 may issue a warning (alert). When it is determined that the target is an impersonator, iris authentication for the target may be not performed, or it may be configured that an authentication result must become failure although the iris authentication is performed. When it is determined that the target is an impersonator, the spoofing determining unit 230 may output an instruction which indicates removing contact lenses considering a possibility of an erroneous determination due to detecting a normal colored contact lens (i.e., a situation in which it is determined that the target is an impersonator although the target is not an impersonator).

Gap Between a Pupil and a Lens

Figure 16A:
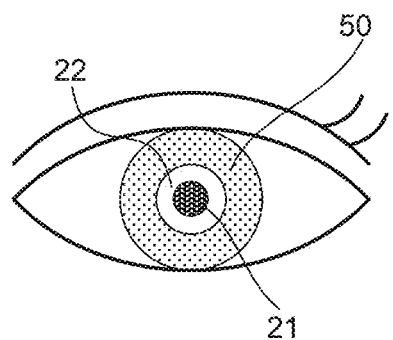
FIG. 16A is a plane view showing examples of a gap between a pupil and a contact lens.
Figure 16B:
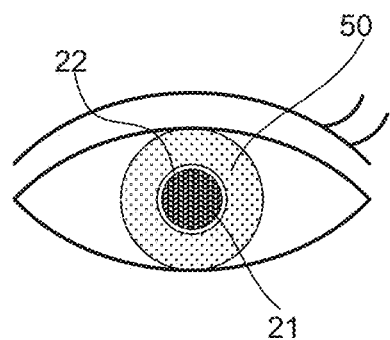
FIG. 16B is a plane view showing examples of a gap between a pupil and a contact lens.
Figure 16C:
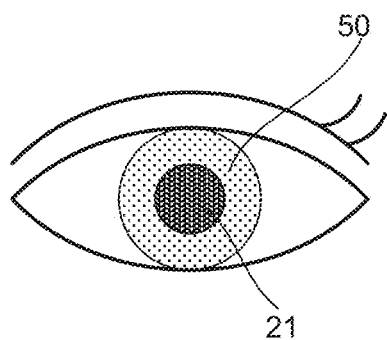
FIG. 16C is a plane view showing examples of a gap between a pupil and a contact lens.

Next, a gap (specifically, a gap which occurs between a pupil and a pattern of a contact lens) detected by the information processing system 20 of the sixth embodiment will be described with referring to FIGS. 16A, 16B and 16C. FIGS. 16A, 16B and 16C are a plane view showing examples of a gap between a pupil and a contact lens.

As shown in FIGS. 16A, 16B and 16C, when a target wears a colored contact lens 50, a gap occurs between a pupil 21 and the colored contact lens 50, thereby an iris can be seen from the gap. However, size of this iris visible area changes according to size of an inner circle indicating an inner border of a patterned area of the colored contact lens 50, size of the pupil 21 (in other words, degree of constriction of the pupil 21) or the like. For example, as shown in FIG. 16A, when the size of pupil 21 is relatively small or a hole portion at a center of the colored contact lens 50 is large, a resulting gap becomes large. In this case, it is thought that a target uses a normal colored contact lens 50, and he/she does not use a patterned contact lens for spoofing. Even if spoofing by using patterned contact lenses is a purpose, an actual iris 22 can be seen from the gap. Therefore, it is possible to prevent injustice by performing authentication by using only actual iris information. Incidentally, the information processing system 20 may detect that a pattern in a gap area and a pattern in a colored contact lens area are different from each other in determining a gap. For example, there is a possibility that a regular pattern is printed on a colored contact lens, thereby the information processing system 20 may determine a gap area by separating a pattern area of the colored contact lens and an original iris area by using this feature.

On the other hand, as shown in FIG. 16B, when size of a pupil 21 is relatively large or a hole portion at a center of a colored contact lens is small, a resulting gap becomes small.

Or, as shown in FIG. 16C, a gap does not occur. In these cases, it is possible to determine that there is a possibility of spoofing.

Technical Effects

Next, technical effects obtained by the information processing system 20 of the sixth embodiment will be described.

As described with referring to FIGS. 14 to 16C, in the information processing system 20 of the sixth embodiment, it is determined whether or not a target is an impersonator on the basis of a gap between a pupil 21 and a colored contact lens 50. Therefore, it is possible to appropriately determine only spoofing by using patterned contact lenses other than normal colored contact lenses. Thereby, it is possible to prevent illegal breaking through an iris authentication or the like without reducing usability for a user, who wears colored contact lenses.

Seventh Embodiment

An information processing system 20 of a seventh embodiment will be described with referring to FIGS. 17 to 18D. The seventh embodiment differs from the sixth embodiment described above in only a part of operation. Remaining portions of the seventh embodiment may be the same as the first to the sixth embodiments. Therefore, portions, that differ from embodiments already described, of the seventh embodiment will be described in detail, and descriptions of remaining portions, that are overlapped with embodiments already described, are appropriately omitted.

Flow of Operation

First, flow of operation of the information processing system 20 of the seventh embodiment will be described with referring to FIG. 17. FIG. 17 is a flowchart showing the flow of the operation of the information processing system of the seventh embodiment. Incidentally, in FIG. 17, the same sign is put to a processing, which is similar to a processing shown in FIG. 15.

Figure 17:
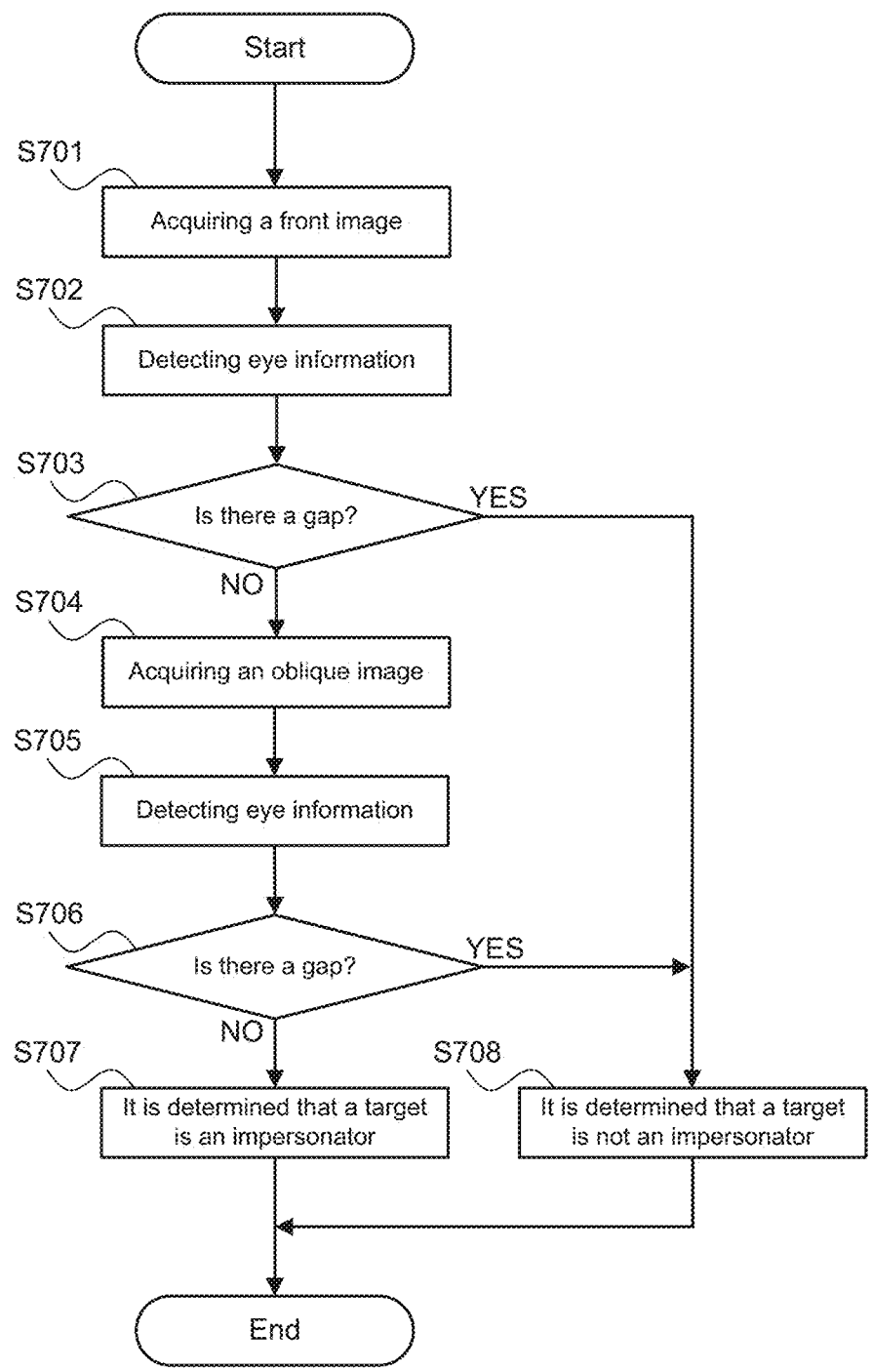
FIG. 17 is a flowchart showing flow of operation of an information processing system of a seventh embodiment.

As shown in FIG. 17, when the information processing system 20 of the seventh embodiment operates, first, an image acquiring unit 210 acquires a front image of a target (step S701). Then, the eye information detecting unit 220 detects a pupil 21 of the target and a colored contact lens 50 worn by the target from the front image acquired by the image acquiring unit 210 (step S702).

Then, a spoofing determining unit 230 determines whether or not a gap occurs between the pupil 21 and the colored contact lens 50 on the basis of information detected from the front image by the eye information detecting unit 220 (step S703). Here, when the gap occurs (step S703: YES), the spoofing determining unit 230 determines that the target is not a spoofing (step S708).

On the other hand, when the gap does not occur (step S703: NO), the image acquiring unit 210 acquires an oblique image of the target (step S704). Then, the eye information detecting unit 220 detects the pupil 21 of the target and the colored contact lens 50 worn by the target from the oblique image acquired by the image acquiring unit 210 (step S705).

Then, the spoofing determining unit 230 determines whether or not a gap occurs between the pupil 21 and the colored contact lens 50 on the basis of information detected from the oblique image by the eye information detecting unit 220 (step S706). When the gap does not occur in the oblique image in addition to the front image (step S706: NO), the spoofing determining unit 230 determines that the target is an impersonator (step S707). On the other hand, when the gap does not occur (step S706: YES), the spoofing determining unit 230 determines that the target is not an impersonator (step S708).

Gap in an Oblique Image

Next, a gap occurring in an oblique image will be specifically described with referring to FIGS. 18A, 18B, 18C and 18D. FIGS. 18A, 18B, 18C and 18D are a plane view showing examples of a gap between a pupil and a contact lens in an oblique image.

FIGS. 18A, 18B, 18C and 18D indicate an appearance of an iris 22 when a gaze is directed to the right, left, upper, and lower, respectively. As described already, since the iris 22 is planar and the iris 22 is placed at a deeper position of an eye than a colored contact lens 50, a gap occurs due to a difference in depth between the colored contact lens 50 and the iris 22 when the eye is captured from a little diagonal. Specifically, even if the gap is not recognized in a front image, the gap occurs between the pupil 21 and the colored contact lens 50 in an oblique image, thereby the iris 22, which does not appear in the front image, appears.

By using characteristics described above, it is possible to determine whether or not a target is an impersonator on the basis of a gap occurring in an oblique image. Specifically, it is possible to determine that a target wears normal contact lenses 50 (i.e., contact lenses not for spoofing) when a gap occurs in an oblique image. On the other hand, it is possible to determine that a target wears patterned contact lenses (i.e., contact lenses for spoofing) when a gap does not occur even in an oblique image.

Technical Effects

Next, technical effects obtained by the information processing system 20 of the seventh embodiment will be described.

Figure 18A:
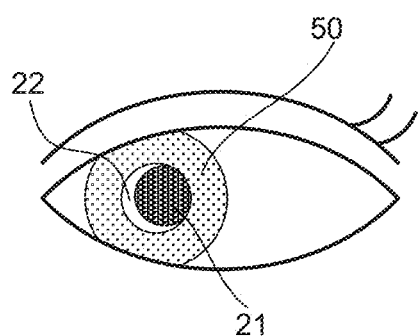
FIG. 18A is a plane view showing examples of a gap between a pupil and a contact lens in an oblique image.
Figure 18B:
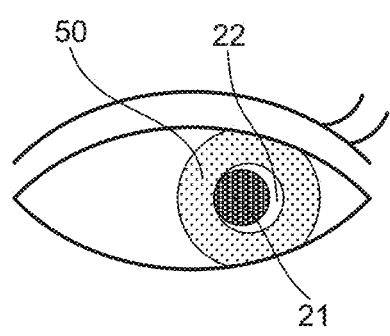
FIG. 18B is a plane view showing examples of a gap between a pupil and a contact lens in an oblique image.
Figure 18C:
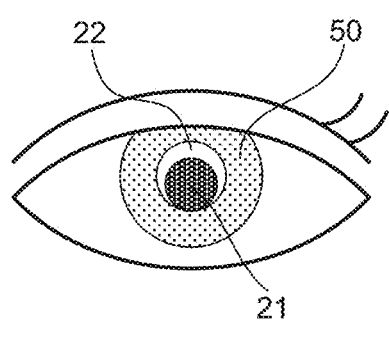
FIG. 18C is a plane view showing examples of a gap between a pupil and a contact lens in an oblique image.
Figure 18D:
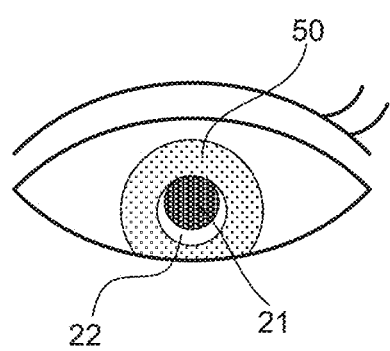
FIG. 18D is a plane view showing examples of a gap between a pupil and a contact lens in an oblique image.

As described with referring to FIGS. 17 to 18D, in the information processing system 20 of the seventh embodiment, it is determined that whether or not a target is an impersonator on the basis of a gap occurring in an oblique image. Therefore, it is possible to appropriately determine spoofing using patterned contact lenses.

Specifically, it is possible to determine spoofing in accuracy by identifying normal colored contact lenses 50, and patterned contact lenses for spoofing.

Eighth Embodiment

An information processing system of an eighth embodiment will be described with referring to FIGS. 19A to 20B. The eighth embodiment explains specifically examples of guiding indications for capturing an iris from diagonal in the first to the seventh embodiments described above. In the eighth embodiment, a configuration and/or flow of operation of the system other than guiding may be the same as the first to the seventh embodiments. Therefore, portions, that differ from embodiments already described, of the eighth embodiment will be described in detail, and descriptions of remaining portions, that are overlapped with embodiments already described, are appropriately omitted. Incidentally, generating guiding information may be performed by the above-mentioned processor 11 (see FIG. 1), for example. Presenting the guiding information may be performed by the above-mentioned output device 16 (see FIG. 1), for example. The guiding information may be displayed on a display as images and/or messages. The guiding information may be outputted as audio information and/or sound information by using a speaker.

Guiding by a Point

Figure 19A:
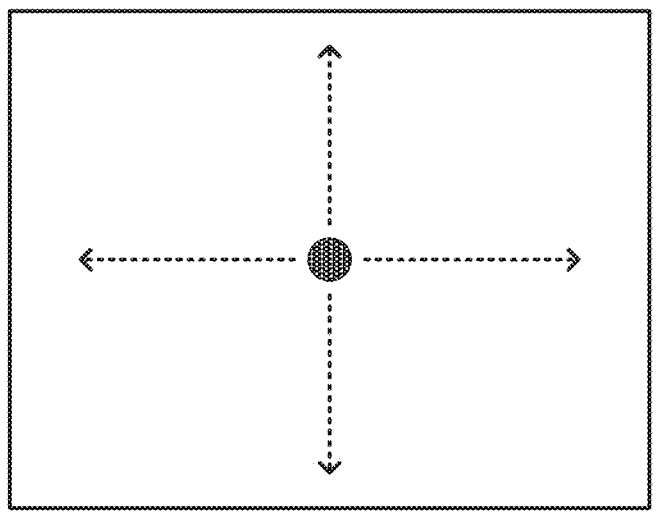
FIG. 19A is a plane view (part 1) showing examples of guiding indications of an information processing system of an eighth embodiment.
Figure 19B:
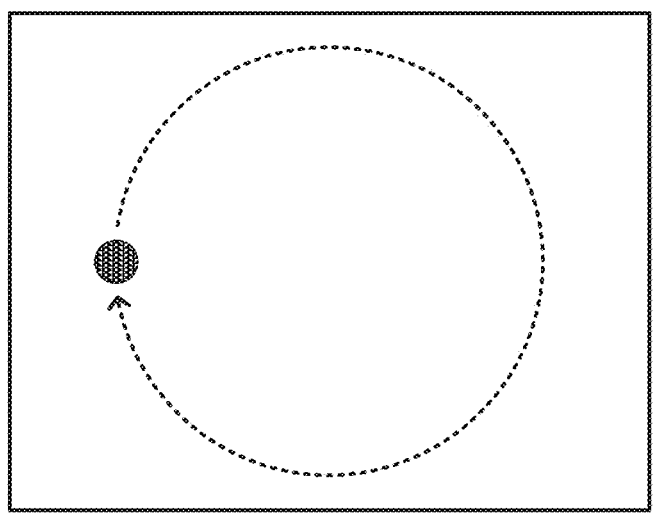
FIG. 19B is a plane view (part 1) showing examples of guiding indications of an information processing system of an eighth embodiment.

First, a first displaying example by the information processing system of the eighth embodiment will be described with referring to FIGS. 19A and 19B. FIGS. 19A and 19B are a plane view (part 1) showing examples of guiding indications of an information processing system of an eighth embodiment.

As shown in FIGS. 19A and 19B, guiding information in capturing an oblique image may be information displaying a point, to make a target gaze at, on a display, and moving the point to a direction, in which a gaze of the target is guided. For example, in an example shown in FIG. 19A, a point moves from a center of a display to up, down, left and right in sequence. Therefore, it is possible to acquire images in which an eye of a target turns to upper, lower, left and right, respectively. In an example shown in FIG. 19B, a point moves so that the point draws a circle on a display. Therefore, it is possible to acquire images in which an eye of a target turns in various directions. Incidentally, for example, a message that "Please, follow the point moving on the display with your eyes" or the like may be displayed in addition to the above-mentioned point. These messages may be outputted by voice.

Guiding by an Arrow

Figure 20A:
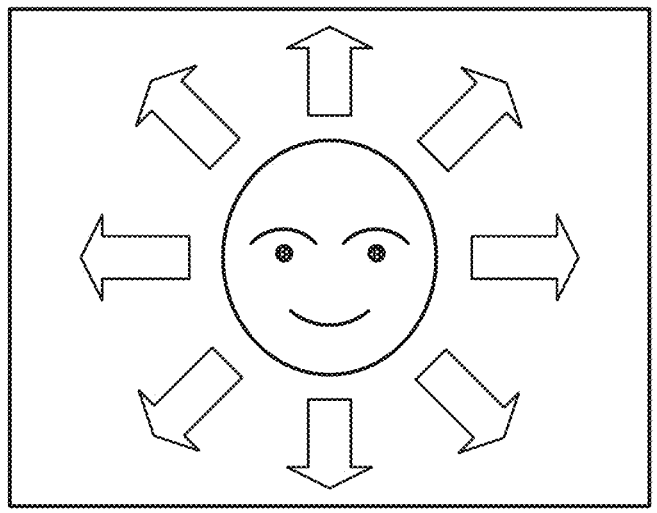
FIG. 20A is a plane view (part 2) showing examples of guiding indications of the information processing system of the eighth embodiment.
Figure 20B:
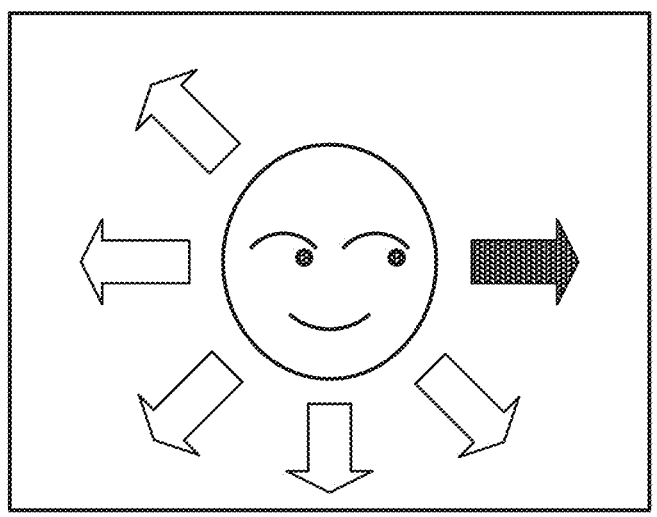
FIG. 20B is a plane view (part 2) showing examples of guiding indications of the information processing system of the eighth embodiment.

Next, a second displaying example by the information processing system of the eighth embodiment will be described with referring to FIGS. 20A and 20B. FIGS. 20A and 20B are a plane view (part 2) showing examples of guiding indications of the information processing system of the eighth embodiment.

As shown in FIGS. 20A and 20B, guiding information in capturing an oblique image may be information displaying a plurality of arrows indicating directions in which a gaze of a target is guided, respectively, around a face of the target displayed on a display. For example, as shown in FIG. 20A, arrows are displayed around a face of a target in eight directions: upper, upper-right, right, lower-right, lower, lower-left, left and upper-left. Therefore, it is possible to acquire images, in which eyes of the target turn to upper, upper-right, right, lower-right, lower, lower-left, left and upper-left. Incidentally, as shown in FIG. 20B, an arrow corresponding to a direction in which a target currently turns, may be highlighted. In this example, since the target turns to the right, the arrow showing the right direction is highlighted (e.g., the arrow displayed with a color, which is different from other arrows). An arrow corresponding to a direction in which gaze guiding has been ended, may be disappeared. In this example, since guiding for the upper and the upper-right have ended, arrows directing to the upper and the upper-right are disappeared. For example, a message that "Please, direct your gaze to the right" or the like may be displayed. This message may be outputted by voice. The message may be outputted by displaying and voice (i.e., displaying and voice outputting may be performed at the same time).

Incidentally, examples in which a gaze direction is guided have been cited here. However, displaying in which a direction of a face is guided, may be performed, for example. Information specifically indicating degree of a moving amount may be displayed. For example, messages that "Please move your gaze by 30 degrees", "Please move your gaze by 5 cm" or the like may be outputted. A moving amount of a gaze may be estimated by a gaze estimating technique, and then, a message that "Please move your gaze more" when the moving amount is not enough, and a message that "Please reduce movement of your gaze" when the moving amount is too large, may be displayed. These messages may be outputted by voice instead of displaying.

The above-mentioned guiding examples are just examples. Guiding may be performed by other configurations. For example, a plurality of LED lights are placed around a display, and then a LED light corresponding to a direction in which a gaze is guided may be turned on or blinked. A message that "Please move your gaze to the right" may be displayed without displaying an image. A message that "Please move your gaze to the right" may be outputted by voice.

Technical Effects

Next, technical effects obtained by the information processing system on the eighth embodiment will be described.

As described with referring to FIGS. 19A to 20B, in the information processing system of the eighth embodiment, it is possible to appropriately capture an oblique image by displaying guiding information thereby guiding a gaze of a target.

Incidentally, it is possible to capture an oblique image by changing a position of a camera 18 instead of guiding a gaze of a user. Specifically, the camera 18 may be placed at the front of a target when a front image is captured, and the camera 18 may be placed at a diagonal position viewed from the target when an oblique image is captured. Capturing images may be started in a condition that the camera 18 is placed at the front of a target, and then, capturing images may be continued while moving a position of the camera 18 to a diagonal position (i.e., the position of the camera 18 may be moved while capturing movie). In this case, moving the camera 18 and capturing images may be stopped at a time point at which an image making it possible to determine that a target is an impersonator is captured.

When there are a plurality of cameras 18, a position of a camera may be substantially changed by changing a camera 18 for capturing an image. For example, first, eyes of a target may be captured by a first camera, and then, eyes of the target may be captured by a second camera placed at a position which is different from a position of the first camera. Eyes of a target may be captured by a first camera and a second camera placed at positions which are different from each other at the same time.

A processing method, in which a program, which makes the configuration of each of above-mentioned embodiments operate, is recorded on a recording medium, and then, the program is executed at a computer by reading the program recorded on the recording medium as codes so that functions of each of embodiments are realized, is included in a category of each of embodiments described above. In other words, a computer readable recording medium is included in the category of each of embodiments. The program itself is also included in each of embodiments in addition to a recording medium, on which the above-mentioned program is recorded. Additionally, it may be configured to be able to download a part of or all of the program from a server to a user terminal when the program is stored in the server.

For example, a floppy disk, a hard disk, an optical disk, a magneto-optical disk, a CD-ROM, a magnetic tape, a non-volatile memory card and a ROM can be used as the recording medium. It is not limited to perform processing with only the program recorded in the recording medium. An aspect which performs processing by operating on an operating system and by cooperating with other soft wear(s) and/or function(s) of extension board(s) is included in each of embodiments. Additionally, it may be configured to be able to download a part of or all of the program from a server to a user terminal when the program is stored in the server.

SUPPLEMENTARY NOTES

In regard to embodiments described above, it may be further described as following supplementary notes, but it is not limited.

Supplementary Note 1

An information processing system described in a supplementary note 1 is an information processing system comprising: an image acquiring means for acquiring an oblique image in which an eye of a target is captured from an angle different from an angle corresponding to a front of the target; a center detecting means for detecting a center position of a pupil and a center position of an iris from the oblique image; and a determining means for determining whether or not the target is an impersonator on the basis of difference between the center position of the pupil and the center position of the iris.

Supplementary Note 2

An information processing system described in a supplementary note 2 is the information processing system according to the supplementary note 1, wherein the determining means determines whether or not a first vector, a starting point of which is the center position of the iris and an ending point of which is the center of the pupil, is greater than a first predetermined value, determines whether or not a cosine value of an angle formed by the first vector and a second vector indicating a gaze direction of the target is greater than a second predetermined value when the first vector is greater than the first predetermined value, and determines that the target is an impersonator when the cosine value is greater than the second predetermined value.

Supplementary Note 3

An information processing system described in a supplementary note 3 is the information processing system according to the supplementary note 1 or 2, wherein the image acquiring means acquires a front image in which the eye of the target is captured from the front of the target, in addition to the oblique image, the center detecting means detects the center position of the pupil and the center position of the iris from the front image in addition to the oblique image, and the determining means determines whether or not the target is an impersonator by comparing the difference between the center position of the pupil and the center position of the iris in the oblique image with the difference between the center position of the pupil and the center position of the iris in the front image.

Supplementary Note 4

An information processing system described in a supplementary note 4 is the information processing system according to any one of supplementary notes 1 to 3, wherein the information processing system further comprises a first direction determining means for determining at least one of a capturing direction and degree of an angle in capturing the oblique image on the basis of the difference between the center position of the pupil and the center position of the iris in a front image in which the eye of the target is captured from the front of the target.

Supplementary Note 5

An information processing system described in a supplementary note 5 is the information processing system according to any one of supplementary notes 1 to 4, wherein the information processing system further comprises a second direction determining means for determining a capturing direction in capturing the oblique image on the basis of a shift of the center position of the iris in the eye due to strabismus when the target has strabismus.

Supplementary Note 6

An information processing system described in a supplementary note 6 is an information processing system comprising: an image acquiring means for acquiring an eye image, in which an eye of a target is captured; a detecting means for detecting a pupil of the target and a colored contact lens, which is worn by the target, from the eye image; and a determining means for determining whether or not the target is a an impersonator on the basis of a gap between the pupil and a pattern of the colored contact lens.

Supplementary Note 7

An information processing system described in a supplementary note 7 is the information processing system according to the supplementary note 6, wherein the image acquiring means further acquires an oblique image in which the eye of the target is captured from an angle different from an angle corresponding to the front of the target, the determining means determines that the target is an impersonator when there is no gap between the pupil and the pattern of the colored contact lens.

Supplementary Note 8

An information processing apparatus described in a supplementary note 8 is an information processing apparatus comprising: an image acquiring means for acquiring an oblique image in which an eye of a target is captured from an angle different from an angle corresponding to a front of the target; a center detecting means for detecting a center position of a pupil and a center position of an iris from the oblique image; and a determining means for determining whether or not the target is an impersonator on the basis of difference between the center position of the pupil and the center position of the iris.

Supplementary Note 9

An information processing apparatus described in a supplementary note 9 is an information processing apparatus comprising: an image acquiring means for acquiring an eye image in which an eye of a target is captured; a detecting means for detecting a pupil of the target and a colored contact lens, which is worn by the target, from the eye image; and a determining means for determining whether or not the target is an impersonator on the basis of a gap between the pupil and a pattern of the colored contact lens.

Supplementary Note 10

An information processing method described in a supplementary note 10 is an information processing method executed by at least one computer, the information processing method comprising: acquiring an oblique image in which an eye of a target is captured from an angle different from an angle corresponding to a front of the target; detecting a center position of a pupil and a center position of an iris from the oblique image; and determining whether or not the target is an impersonator on the basis of difference between the center position of the pupil and the center position of the iris.

Supplementary Note 11

An information processing method described in a supplementary note 11 is an information processing method executed by at least one computer, the information processing method comprising: acquiring an eye image in which an eye of a target is captured; detecting a pupil of the target and a colored contact lens, which is worn by the target, from the eye image; and determining whether or not the target is an impersonator on the basis of a gap between the pupil and a pattern of the colored contact lens.

Supplementary Note 12

A recording medium described in a supplementary note 12 is a recording medium on which a computer program is recorded, the computer program making at least one computer execute an information processing method comprising: acquiring an oblique image in which an eye of a target is captured from an angle different from an angle corresponding to a front of the target; detecting a center position of a pupil and a center position of an iris from the oblique image; and determining whether or not the target is an impersonator on the basis of difference between the center position of the pupil and the center position of the iris.

Supplementary Note 13

A recording medium described in a supplementary note 13 is a recording medium on which a computer program is recorded, the computer program making at least one computer execute an information processing method comprising: acquiring an eye image in which an eye of a target is captured; detecting a pupil of the target and a colored contact lens, which is worn by the target, from the eye image; and determining whether or not the target is an impersonator on the basis of a gap between the pupil and a pattern of the colored contact lens.

Supplementary Note 14

A computer program described in a supplementary note 14 is a computer program making at least one computer execute an information processing method comprising: acquiring an oblique image in which an eye of a target is captured from an angle different from an angle corresponding to a front of the target; detecting a center position of a pupil and a center position of an iris from the oblique image; and determining whether or not the target is an impersonator on the basis of difference between the center position of the pupil and the center position of the iris.

Supplementary Note 15

A computer program described in a supplementary note 15 is a computer program making at least one computer execute an information processing method comprising: acquiring an eye image in which an eye of a target is captured; detecting a pupil of the target and a colored contact lens, which is worn by the target, from the eye image; and determining whether or not the target is an impersonator on the basis of a gap between the pupil and a pattern of the colored contact lens.

This disclosure can be appropriately changed with in a range being not contrary to summaries or ideas of inventions, which can be read from entire of the scope of claims and the specification. Information processing systems, information processing apparatuses, information processing methods and recording media with these changes are included in technical ideas of this disclosure.

DESCRIPTION OF REFERENCE NUMERALS AND LETTERS

10, 20 Information processing system
11 Processor
18 Camera
21 Pupil
22 Iris
23 Pupil center
24 Iris center
50 Colored contact lens(es)
110 Image acquiring unit
120 Center detecting unit
130 Spoofing determining unit
140 First direction determining unit
150 Second direction determining unit
210 Image acquiring unit
220 Eye information detecting unit
230 Spoofing determining unit

What is claimed is:

1. An information processing system comprising:
at least one memory configured to store instructions; and
at least one processor configured to execute the instructions to:
acquire an oblique image in which an eye of a target is captured from an angle different from an angle corresponding to a front of the target;
detect a center position of a pupil and a center position of an iris from the oblique image; and
determine whether or not the target is an impersonator on the basis of difference between the center position of the pupil and the center position of the iris.

2. The information processing system according to claim 1, wherein the at least one processor is configured to execute the instructions to:
determine whether or not a first vector, a starting point of which is the center position of the iris and an ending point of which is the center of the pupil, is greater than a first predetermined value,
determine whether or not a cosine value of an angle formed by the first vector and a second vector indicating a gaze direction of the target is greater than a second predetermined value when the first vector is greater than the first predetermined value, and determine that the target is an impersonator when the cosine value is greater than the second predetermined value.

3. The information processing system according to claim 2, wherein the at least one processor is configured to execute the instructions to:
acquire a front image in which the eye of the target is captured from the front of the target, in addition to the oblique image,
detect the center position of the pupil and the center position of the iris from the front image in addition to the oblique image, and
determine whether or not the target is an impersonator by comparing the difference between the center position of the pupil and the center position of the iris in the oblique image with the difference between the center position of the pupil and the center position of the iris in the front image.

4. The information processing system according to claim 3, wherein the at least one processor is further configured to execute the instructions to determine at least one of a capturing direction and degree of an angle in capturing the oblique image on the basis of the difference between the center position of the pupil and the center position of the iris in a front image in which the eye of the target is captured from the front of the target.

5. The information processing system according to claim 4, wherein the at least one processor is further configured to execute the instructions to determine a capturing direction in capturing the oblique image on the basis of a shift of the center position of the iris in the eye due to strabismus when the target has strabismus.

6. The information processing system according to claim 3, wherein the at least one processor is further configured to execute the instructions to determine a capturing direction in capturing the oblique image on the basis of a shift of the center position of the iris in the eye due to strabismus when the target has strabismus.

7. The information processing system according to claim 2, wherein the at least one processor is further configured to execute the instructions to determine a capturing direction in capturing the oblique image on the basis of a shift of the center position of the iris in the eye due to strabismus when the target has strabismus.

8. The information processing system according to claim 1, wherein the at least one processor is configured to execute the instructions to:
acquire a front image in which the eye of the target is captured from the front of the target, in addition to the oblique image,
detect the center position of the pupil and the center position of the iris from the front image in addition to the oblique image, and
determine whether or not the target is an impersonator by comparing the difference between the center position of the pupil and the center position of the iris in the oblique image with the difference between the center position of the pupil and the center position of the iris in the front image.

9. The information processing system according to claim 8, wherein the at least one processor is further configured to execute the instructions to determine at least one of a capturing direction and degree of an angle in capturing the oblique image on the basis of the difference between the center position of the pupil and the center position of the iris in a front image in which the eye of the target is captured from the front of the target.

10. The information processing system according to claim 9, wherein the at least one processor is further configured to execute the instructions to determine a capturing direction in capturing the oblique image on the basis of a shift of the center position of the iris in the eye due to strabismus when the target has strabismus.

11. The information processing system according to claim 8, wherein the at least one processor is further configured to execute the instructions to determine a capturing direction in capturing the oblique image on the basis of a shift of the center position of the iris in the eye due to strabismus when the target has strabismus.

12. The information processing system according to claim 1, wherein the at least one processor is further configured to execute the instructions to determine at least one of a capturing direction and degree of an angle in capturing the oblique image on the basis of the difference between the center position of the pupil and the center position of the iris in a front image in which the eye of the target is captured from the front of the target.

13. The information processing system according to claim 12, wherein the at least one processor is further configured to execute the instructions to determine a capturing direction in capturing the oblique image on the basis of a shift of the center position of the iris in the eye due to strabismus when the target has strabismus.

14. The information processing system according to claim 1, wherein the at least one processor is further configured to execute the instructions to determine a capturing direction in capturing the oblique image on the basis of a shift of the center position of the iris in the eye due to strabismus when the target has strabismus.

15. An information processing apparatus comprising:
at least one memory configured to store instructions; and
at least one processor configured to execute the instructions to:
acquire an oblique image in which an eye of a target is captured from an angle different from an angle corresponding to a front of the target;
detect a center position of a pupil and a center position of an iris from the oblique image; and
determine whether or not the target is an impersonator on the basis of difference between the center position of the pupil and the center position of the iris.

16. An information processing method executed by at least one computer, the information processing method comprising:
acquiring an oblique image in which an eye of a target is captured from an angle different from an angle corresponding to a front of the target;
detecting a center position of a pupil and a center position of an iris from the oblique image; and
determining whether or not the target is an impersonator on the basis of difference between the center position of the pupil and the center position of the iris.

* * * * *